US007725562B2

(12) United States Patent
Blakley, III et al.

(10) Patent No.: US 7,725,562 B2
(45) Date of Patent: May 25, 2010

(54) METHOD AND SYSTEM FOR USER ENROLLMENT OF USER ATTRIBUTE STORAGE IN A FEDERATED ENVIRONMENT

(75) Inventors: George Robert Blakley, III, Round Rock, TX (US); Heather Maria Hinton, Austin, TX (US); Anthony Joseph Nadalin, Austin, TX (US); Birgit Monika Pfitzmann, Samstagern (CH)

(73) Assignee: International Business Machines Corporation, Armonk, NY (US)

( * ) Notice: Subject to any disclaimer, the term of this patent is extended or adjusted under 35 U.S.C. 154(b) by 2019 days.

(21) Appl. No.: 10/334,326

(22) Filed: Dec. 31, 2002

(65) Prior Publication Data

US 2004/0128390 A1    Jul. 1, 2004

(51) Int. Cl.
*G06F 15/16* (2006.01)
(52) U.S. Cl. .................................................. 709/219
(58) Field of Classification Search ................ 709/225, 709/229
See application file for complete search history.

(56) References Cited

U.S. PATENT DOCUMENTS

| 5,968,126 | A | 10/1999 | Ekstrom et al. ............. 709/225 |
| 6,119,160 | A | 9/2000 | Zhang et al. ................. 709/224 |
| 6,185,184 | B1 | 2/2001 | Mattaway et al. ............ 370/230 |
| 6,678,731 | B1 * | 1/2004 | Howard et al. ............... 709/225 |
| 2003/0061057 | A1 * | 3/2003 | Todd et al. ...................... 705/1 |
| 2003/0084170 | A1 * | 5/2003 | de Jong et al. ............... 709/229 |
| 2003/0126039 | A1 * | 7/2003 | Kiyose et al. ................. 705/26 |
| 2003/0139934 | A1 * | 7/2003 | Mandera ......................... 705/1 |
| 2003/0217288 | A1 * | 11/2003 | Guo et al. .................... 713/201 |
| 2004/0158743 | A1 * | 8/2004 | Ham et al. ................... 713/201 |

* cited by examiner

*Primary Examiner*—Larry Donaghue
*Assistant Examiner*—Minh-Chau Nguyen
(74) *Attorney, Agent, or Firm*—Jeffrey S. LaBaw; David H. Judson

(57) ABSTRACT

A computer system is presented for facilitating storage and retrieval of user attribute information within a federated environment at entities that manage such information as a service. Through enrollment processes, certain domains inform online service providers of identities of attribute information providers that may be used to retrieve user attribute information for a particular user. When performing a user-specific operation with respect to a requested resource, e.g., for personalizing documents using user attribute information or for determining user access privileges for the resource, an e-commerce service provider requires user attribute information, which is retrieved from an attribute information provider that has been previously specified through an enrollment operation. The e-commerce service provider may store the identity of the user's attribute information providers in a persistent token, e.g., an HTTP cookie, that is available when the user sends a request for access to a resource.

48 Claims, 19 Drawing Sheets

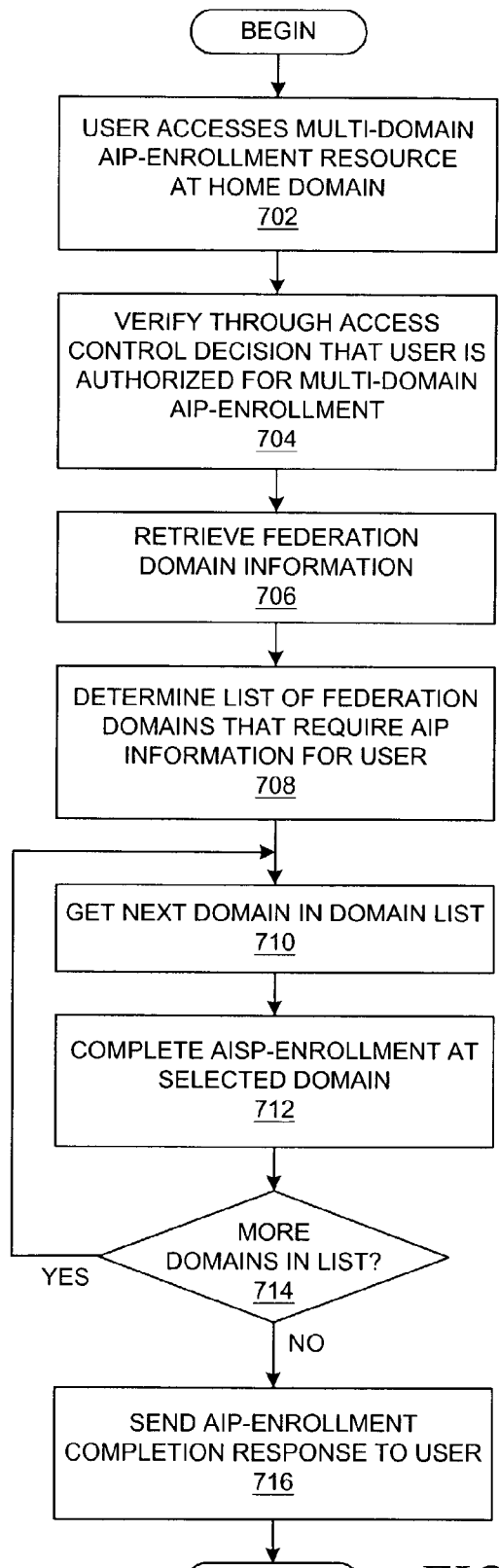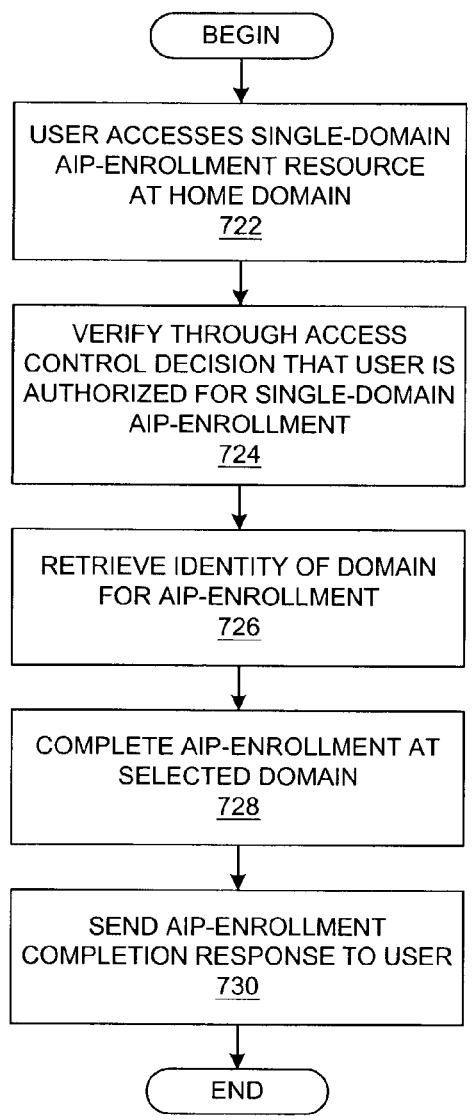
FIG. 7A
FIG. 7B

IBM.COM E-COMMERCE MARKETPLACE

ATTRIBUTE INFORMATION ENROLLMENT WITHIN THE MARKETPLACE

DURING THE ENROLLMENT PROCESS, IT MAY BE DISCOVERED THAT YOU HAVE ALREADY ENROLLED THE IDENTITY OF ONE OR MORE AIPs AT ANOTHER DOMAIN.

WHAT WOULD YOU LIKE TO DO DURING THE ENROLLMENT PROCESS IF SUCH A DISCOVERY IS MADE?

- ● OVERWRITE PREVIOUS INFORMATION WITH NEW INFORMATION — 1006
- ○ APPEND NEW INFORMATION TO PREVIOUS INFORMATION — 1008
- ○ ADD NEW INFORMATION TO PREVIOUS INFORMATION AND ALLOW ME TO RE-PRIORITIZE THE INFORMATION — 1010

CANCEL — 1002     OK — 1004

*FIG. 10A*

IBM.COM E-COMMERCE MARKETPLACE

ECSP-A.COM ALREADY HAS A RECORD OF ONE OR MORE ATTRIBUTE INFORMATION PROVIDERS FOR YOU. YOU MAY CHANGE THE PRIORITIES FOR EACH ATTRIBUTE INFORMATION PROVIDER.

| | | |
|---|---|---|
| AIP-V | 5 | |
| AIP-W | 1 | |
| AIP-X | 3 | |
| AIP-Y | 10 | |

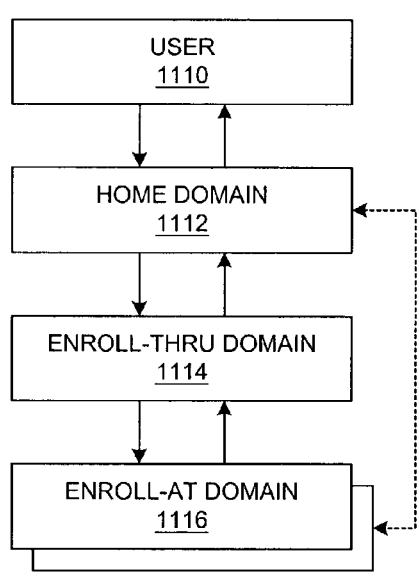
*FIG. 11A*
*FIG. 11B*
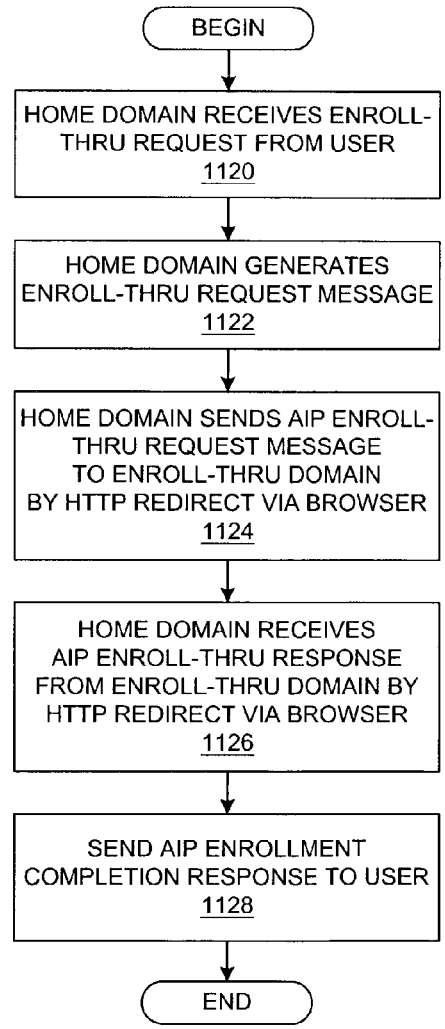
*FIG. 11C*

METHOD AND SYSTEM FOR USER ENROLLMENT OF USER ATTRIBUTE STORAGE IN A FEDERATED ENVIRONMENT

CROSS-REFERENCE TO RELATED APPLICATIONS

The present application is related to the following applications with a common assignee:

U.S. Ser. No. 10/512,229, filed Mar. 26, 2003, titled "Efficient browser-based identity management providing personal control and anonymity";

U.S. Ser. No. 09/710,926, filed Nov. 9, 2000, titled "Method and system for Web-based cross-domain single-sign-on authentication";

U.S. Ser. No. 10/034,725, filed Dec. 19, 2001, titled "System and method for user enrollment in an e-community";

U.S. Ser. No. 10/184,664, filed Jun. 28, 2002, titled "Method and system for user-determined authentication in a federated environment";

U.S. Ser. No. 10/334,605, filed Dec. 31, 2002, titled "Method and system for user-determined attribute enrollment of user attribute storage in a federated environment";

U.S. Ser. No. 10/334,609, filed Dec. 31, 2002, titled "Method and system for enroll-thru operations and reprioritization operations in a federated environment"; and U.S. Ser. No. 10/334,539, filed Dec. 31, 2002, titled "Method and System for Attribute Exchange in a Heterogeneous Federated Environment".

BACKGROUND OF THE INVENTION

1. Field of the Invention

The present invention relates to an improved data processing system and, in particular, to a method and apparatus for multicomputer data transferring. Still more particularly, the present invention provides a method and apparatus for distributed data storage and data transfer of user information.

2. Description of Related Art

The Internet has greatly facilitated the exchange of information for many purposes. Many applications have incorporated Internet-related standards, thereby enabling organizations to collaborate over the Internet while maintaining private networks. As Internet-connected applications have become more sophisticated, organizations have shown a desire to increase the level of collaboration, particularly within so-called federated environments.

In a federated environment, each user is typically registered in a home domain that provides certain fundamental services to a user. When a user logs into the user's home domain through some form of authentication process, the user is allowed to access secured resources that are supported by the home domain in accordance with the user's previously defined authorization attributes. In this manner, the user has a permanent relationship with the user's home domain.

In addition, the home domain may have a permanent relationship with many other domains in a federation or a federated environment, sometimes also called business-to-business (B2B) or e-community domains. Each domain or organization within a federated environment may share resources to some extent with users in other domains or organizations within the federated environment.

As users become more knowledgeable about the Internet, they expect enterprises to collaborate so that burdens on the user are reduced. These expectations also apply to management of informational characteristics about a user, sometimes referred to as user attributes. In some circumstances and under certain restrictions, a user might assume that once he or she has provided some user information to one computer system, the user information might be available throughout the user's current session without regard to the various computer boundaries that are sometimes invisible to the user. Enterprises generally try to fulfill these expectations in the operational characteristics of their deployed systems, not only to placate users but also to increase user efficiency, whether the user efficiency is related to employee productivity or customer satisfaction.

More specifically, with the current computing environment in which many applications use Web-based user interfaces that are accessible through a common browser, users expect more user-friendliness and low or infrequent barriers to movement from one Web-based application to another. In this context, users are coming to expect the ability to jump from interacting with an application on one Internet domain to another application on another domain with minimal regard to the information barriers between domains. Even if many systems provide easy-to-use Web-based interfaces, though, a user may still be forced to reckon with multiple user information requests or requirements that stymie user movement across a set of domains. Subjecting a user to multiple information requests or requirements in a short time frame significantly affects the user's efficiency.

Most systems that manage user attributes were designed to work within a single enterprise rather than in a federated environment of organizations which are loosely coupled. Hence, the barriers that are presented by user information requests or requirements are becoming increasingly burdensome as more organizations participate in federated computing environments.

As mentioned above, within a federated environment, a user that is a registered member of one organization can get access to a remote resource that is controlled by another organization; each organization is responsible for the administration of the organization's own registered users and resources, yet the computer systems of the federated organizations interoperate in some manner to share resources between registered members of the organizations. These systems have not offered significant user-level control over the extent to which user attributes are released to, or shared with, other organizations. However, privacy laws require that some organizations allow users to control the personally identifiable information that is released by an organization and to whom it is released. The demand for more privacy laws has increased as users have learned the ways in which private information can be abused.

Therefore, it would be advantageous to provide a method for user-level control over the storage, management, and distribution of user attributes within a federated environment while minimizing user inconvenience and/or information barriers between federated organizations.

SUMMARY OF THE INVENTION

A computer system is presented for facilitating storage and retrieval of user attribute information within a federated environment at entities that manage such information as a service. Through enrollment processes, certain domains inform online service providers of identities of attribute information providers that may be used to retrieve user attribute information for a particular user. When performing a user-specific operation with respect to a requested resource, e.g., for personalizing documents using user attribute information or for determining user access privileges for the resource, an e-commerce service provider requires user attribute information, which is retrieved from an attribute information provider that has been previously specified through an enrollment operation. The e-commerce service provider may store the identity of the user's attribute information providers in a persistent token, e.g., an HTTP cookie, that is available when the user sends a request for access to a resource.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 7A is a flowchart that depicts a multi-domain AIP-enrollment process;

FIG. 7B is a flowchart that depicts a single-domain AIP-enrollment process;

FIG. 10A is a graphical user interface window which shows a set of selectable options that are presented to a user by a home domain that allows a user to specify whether the user's AIP information should be reprioritized during an enrollment operation;

FIG. 10C is a graphical user interface window through which an e-commerce service provider allows a user to reprioritize the user's AIP information during an AIP-enrollment operation;

FIG. 11A is a graphical user interface window which shows a set of selectable options that are presented to a user by a home domain that allows a user to specify a different home domain from which to initiate the AIP-enrollment operation;

FIG. 11B is a block diagram that depicts the interaction among a user, a home domain, an enroll-thru domain, and at least one enroll-at domain during the completion of an AIP-enrollment operation;

FIG. 11C is a flowchart that depicts a process by which a home domain requests an AIP-enrollment operation at an enroll-thru domain;

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
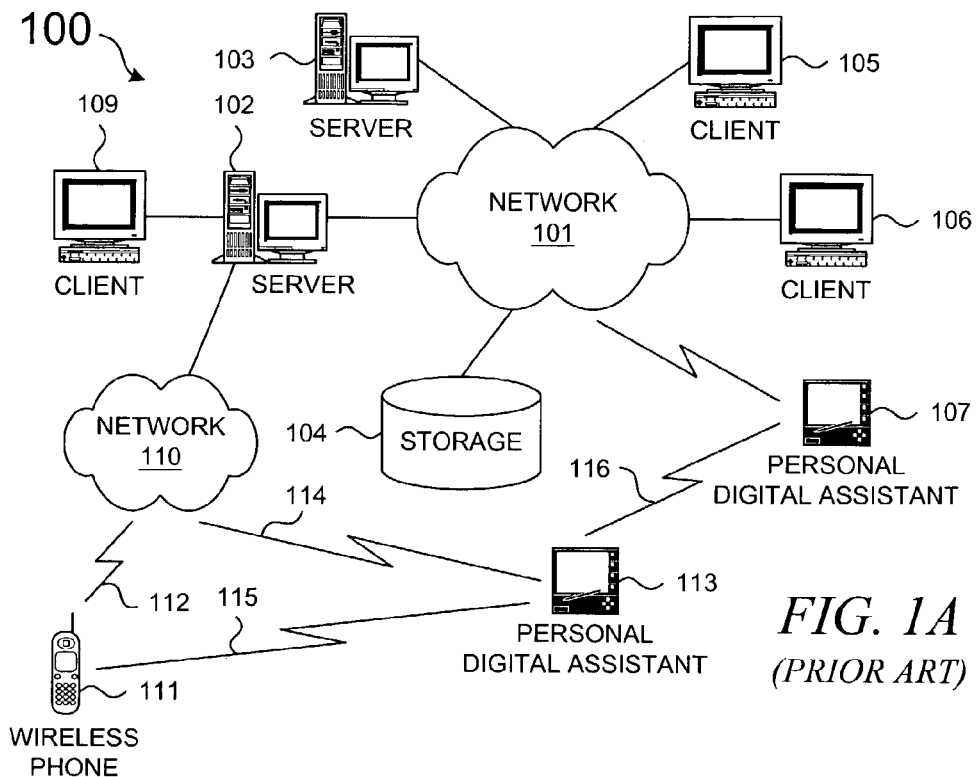
FIG. 1A depicts a typical network of data processing systems, each of which may implement the present invention.

With reference now to the figures, FIG. 1A depicts a typical network of data processing systems, each of which may implement the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as LDAP (Lightweight Directory Access Protocol), TCP/IP (Transport Control Protocol/Internet Protocol), HTTP (HyperText Transport Protocol), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks or personal ad-hoc networks. In a similar manner, PDA 113 can transfer data to PDA 107 via wireless communication link 116.

The present invention could be implemented on a variety of hardware platforms and software environments. FIG. 1A is intended as an example of a heterogeneous computing environment and not as an architectural limitation for the present invention.

Figure 1B:
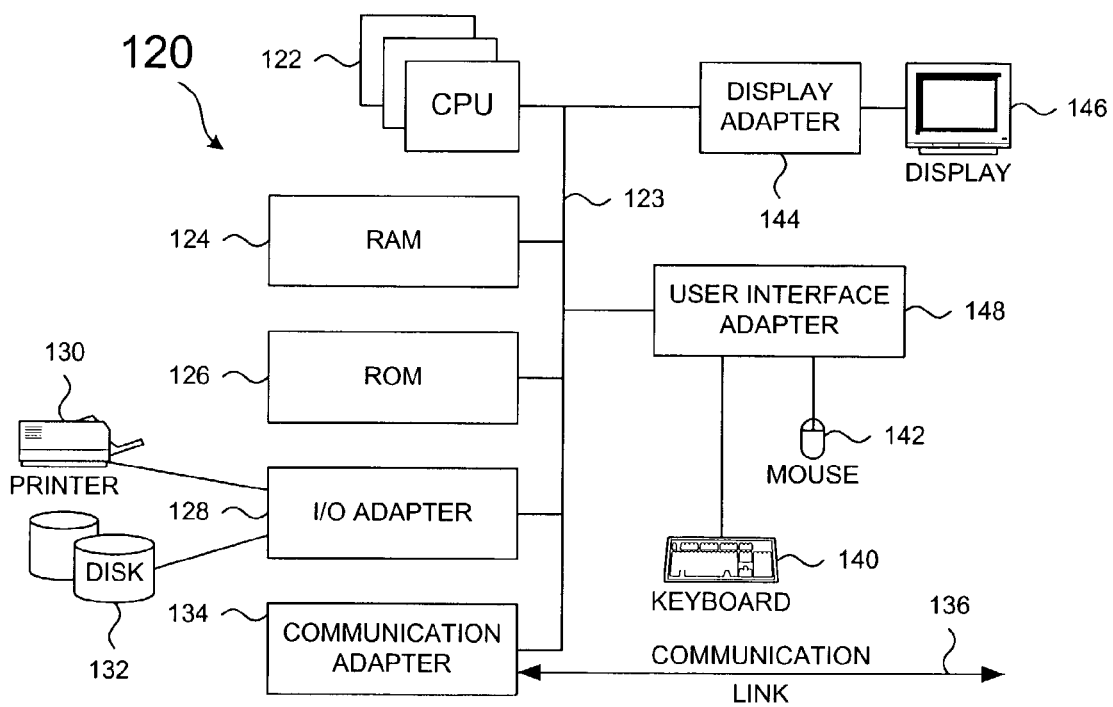
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files. It should also be noted that the distributed data processing system shown in FIG. 1A is contemplated as being fully able to support a variety of peer-to-peer subnets and peer-to-peer services.

Figure 1C:
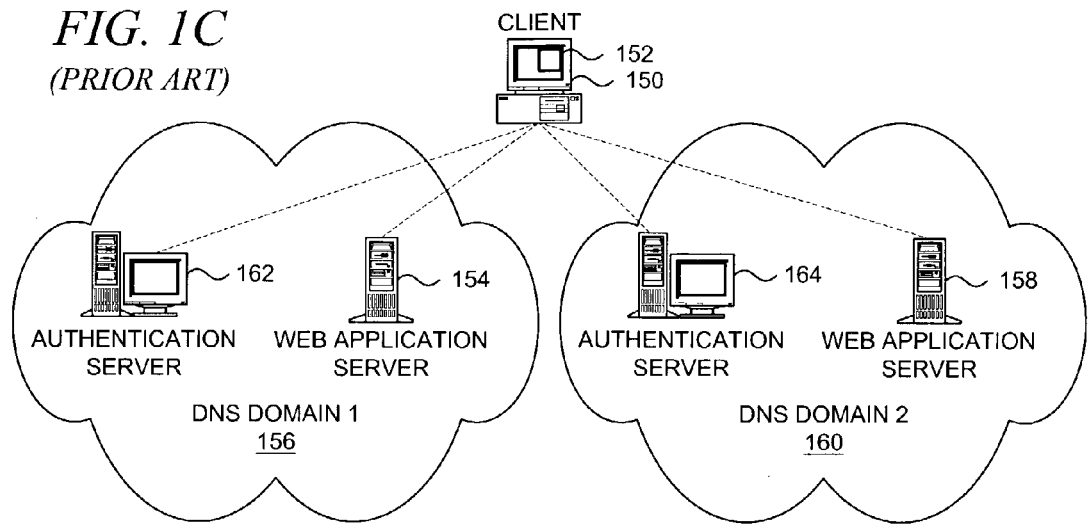
FIG. 1C illustrates a Web-based environment in which the present invention may be implemented.

With reference now to FIG. 1C, a network diagram illustrates a more specific, yet generic, Web-based environment in which the present invention may be implemented. In this environment, a user of a browser 152 at client 150 desires to access a protected resource on web application server 154 in DNS domain 156, or on web application server 158 in DNS domain 160. A protected resource is a resource (an application, an object, a document, a page, a file, executable code, or other computational resource, communication-type resource, etc.) that is only accessed or retrieved if the requesting client browser is both authenticated and authorized. Each DNS domain may have an associated authentication server 162 and 164. Typically, once the user is authenticated by the authentication server, a cookie may be set and stored in a cookie cache in the browser.

Figure 1D:
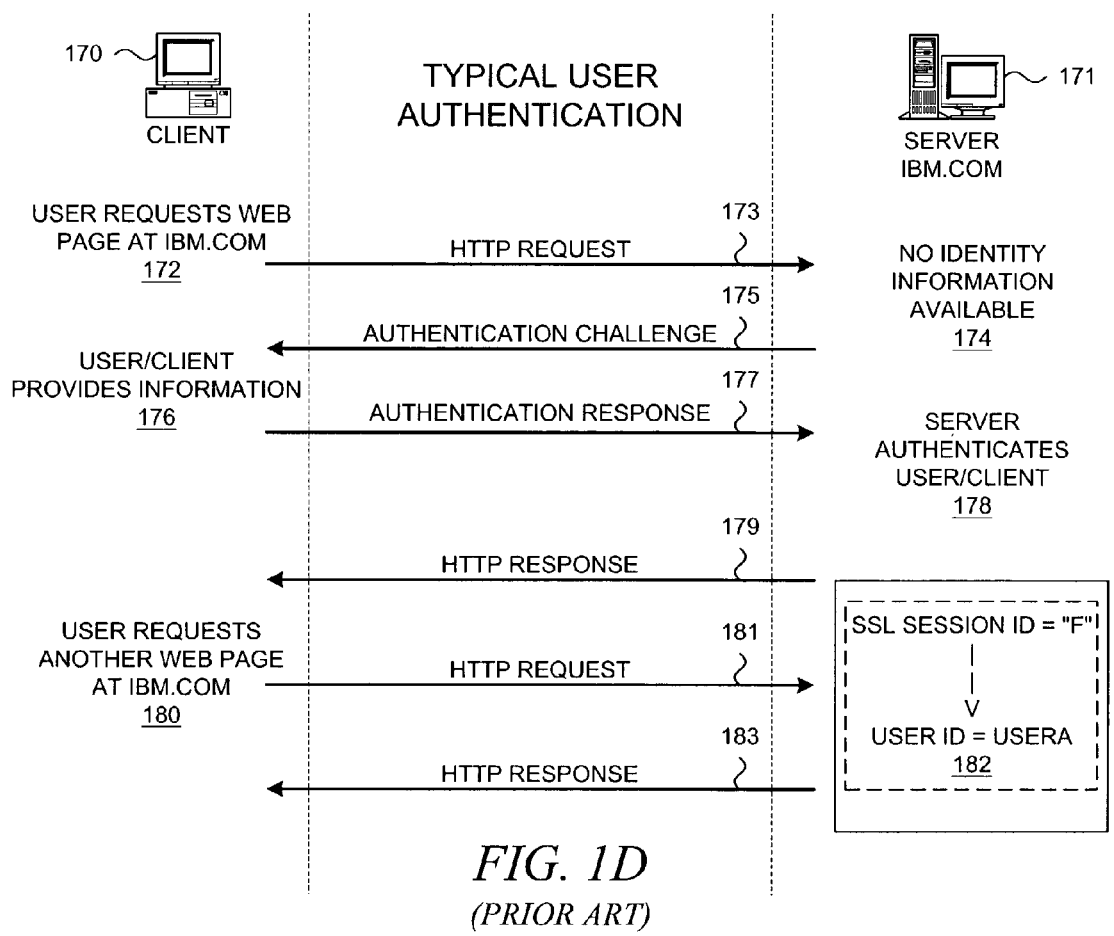
FIG. 1D is a data flow diagram illustrating a prior art process that may be used when a client attempts to access a protected resource.

With reference now to FIG. 1D, a data flow diagram illustrates a prior art process that may be used when a client attempts to access a protected resource. As illustrated, the user at a client workstation 170 seeks access over a computer network to a protected resource on a server 171 through the user's Web browser executing on the client workstation. As noted above, a protected resource is identified by a Uniform Resource Locator (URL), or more generally, a Uniform Resource Identifier (URI), that can only be accessed by an authenticated and authorized user. The computer network may be the Internet, an intranet, or other network, as shown in FIG. 1A or FIG. 1B, and the server may be a Web Application Server (WAS), a server application, a servlet process, or the like.

The process is initiated when the user requests the protected resource, such as a Web page within the domain "ibm.com" (step 172). The Web browser (or associated application or applet) generates an HTTP request message that is sent to the Web server that is hosting the domain "ibm.com" (step 173). The server determines that it does not have an active session for the client (step 174), so the server requires the user to perform an authentication process by sending the client some type of authentication challenge (step 175). The authentication challenge may be in various formats, such as a Hypertext Markup Language (HTML) form. The user then provides the requested or required information (step 176), such as a user identifier and an associated password, or the client may automatically return certain information.

The authentication response information is sent to the server (step 177), at which point the server authenticates the user or client (step 178), e.g., by retrieving previously submitted registration information and matching the presented authentication information with the user's stored information. Assuming the authentication is successful, an active session is established for the authenticated user or client.

The server then retrieves the requested Web page and sends an HTTP response message to the client (step 179). At that point, the user may request another page within "ibm.com" (step 180) within the browser by clicking a hypertext link, and the browser sends another HTTP request to the server (step 181). At that point, the server recognizes that the user has an active session (step 182), and the server sends the requested Web page back to the client in another HTTP response message (step 183).

Although FIG. 1D depicts a typical prior art process, it should be noted that other alternative session state management techniques may be depicted, such as using cookies to identify users with active sessions, which may include using the same cookie that is used to provide proof of authentication.

FIG. 1C and FIG. 1D focus on user authentication operations. In general, after a user has been authenticated within a domain, it may be assumed that the domain provides user access to various resources. Although the authentication process merely establishes the identity of a user, in some domains, the identity of a user may be sufficient information in a determination to provide access to resources. In these domains, access to resources may be provided to all authenticated users. In other domains, however, when a user requests a resource, a resource manager within a domain may need additional information about the user, i.e. user attributes, before performing an action on behalf of the user. Typically, the identity of the user is employed to obtain user attributes that have been previously associated with the user. After the resource manager obtains the necessary user attributes, the resource manager provides the resource to the user after employing the retrieved user attributes in some manner, e.g., in a personalization operation or an authorization operation. The local entity that manages user attributes at a typical service provider within an enterprise or domain may be generally termed an attribute information manager (AIM).

A variety of resource managers may operate within a domain or at different domains, and each resource manager may require user attributes for a particular purpose. For example, an authorization server may need user attributes in order to determine whether a user has the proper privilege attributes to access a particular resource in accordance with access control policies associated with a resource. If the user has the necessary privilege attributes, then the authorization server provides the resource to the user. In another example, a content server may require user attributes in order to personalize in some manner the content that is returned to the user. The content server may limit or modify the content that is sent to the user based on user attributes, e.g., gender, for marketing or other purposes.

Figure 2:
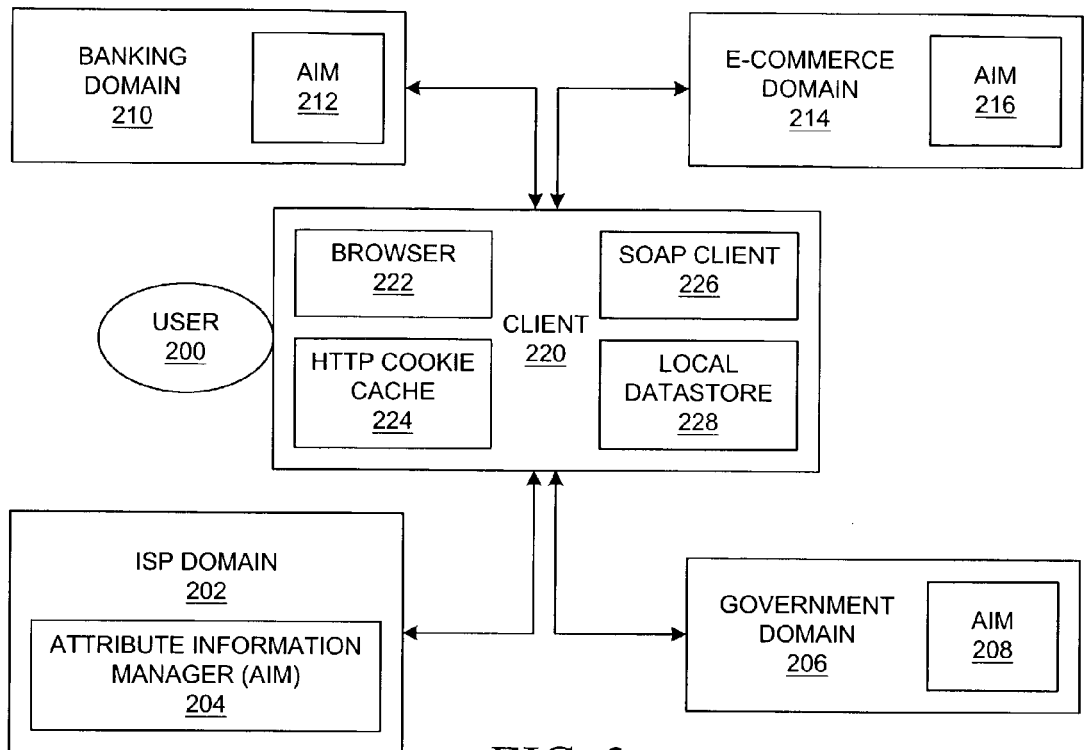
FIG. 2 is a block diagram that depicts an example of a typical online transaction that requires user attributes.

With reference now to FIG. 2, a block diagram depicts an example of a typical online transaction that requires user attributes. FIG. 2 illustrates some of the difficulties that a user may experience when accessing multiple domains that require the user to provide user information. Referring again to FIG. 1C and FIG. 1D, a user may be required to complete an authentication operation prior to gaining access to a controlled resource, as shown in FIG. 1D. Although not shown in FIG. 1D, an attribute information manager may be deployed on server 171 to manage user attributes that are required for an access control decision. As shown in FIG. 1C, a user may have multiple current sessions within different domains 156 and 160, and although they are not shown in FIG. 1C, each domain may employ an attribute information manager. In a similar manner, FIG. 2 also depicts a set of domains, each of which may support some type of attribute information manager.

User 200 may be registered at domain 202, which may support attribute information manager 204 that manages user attributes for user 200. Domain 202 may be an Internet Service Provider (ISP) that provides Internet connection services, email services, and possibly other e-commerce services. Alternatively, domain 202 may be an Internet portal that is frequently accessed by user 200. Domain 202 may store a wide-ranging set of user attributes for user 200, including personal, financial, and administrative attributes, which might include content preferences.

Government domain 206 supports attribute information manager 208 that manages various government-related attributes about user 200. Banking domain 210 supports attribute information manager 212 that manages various attributes for a bank. E-commerce domain 214 similarly supports attribute information manager 216.

Each of the above-noted domains may use some form of storage on client 220 that is operated by user 200 in order to accomplish certain operations on behalf of client 220. For example, if user 200 is using browser application 222 to access an application that is supported by a domain, then the domain may set an HTTP cookie in cookie cache 224. If user 200 is using some other application, e.g., an application that incorporates functionality to act as SOAP client 226, then local datastore 228 may be used as client-side storage.

As noted previously, when a user attempts to move from one domain to another domain within the Internet or World Wide Web by accessing resources at the different domains, a user may be subjected to multiple user information requests or requirements, which can significantly slow the user's progress across a set of domains. Subjecting a user to multiple information requests or requirements in a short period of time may significantly affect the user's ability to complete transactions efficiently. Using FIG. 2 as an exemplary environment, user 200 may be involved in a complicated online transaction with e-commerce domain 214 in which the user is attempting to purchase an on-line service that is limited to users who are at least 18 years old and who have a valid driver license, a valid credit card, and a U.S. bank account.

Although user 200 should be able to provide all of the required user attribute information to domain 214, it requires time and patience to enter the information, particularly when user 200 may be frustrated by the fact that all of this user attribute information is already stored somewhere within the other domains. For example, user 200 may have previously visited e-commerce domain 214 and purchased a different on-line service. During the prior transaction, user 200 may have only been required to provide a credit card number, but user 200 may or may not have given permission to domain 214 to store the credit card number in a user profile that is managed by attribute information manager 216. However, if user 200 was not required to provide any other user attribute information for the prior transaction, domain 214 would not have access to the user attribute information that is required for the current transaction. Attribute information manager 212 at domain 210 has the user's bank account information, which may be required by domain 214 as a backup payment source if a credit card transaction is declined. Attribute information manager 208 at government domain 206 has the user's driver license information, yet neither domain 206 nor domain 210 support a mechanism for transferring user attribute information to domain 214. User 200 must somehow have all of this user attribute information communicated to domain 214 in a secure and authenticatable manner before user 200 will receive the desired on-line service.

In the context of the World Wide Web, users are coming to expect the ability to interact with an application on one Internet domain to another application on another domain with minimal regard to the information barriers between each particular domain. Users do not want the frustration that is caused by the scenario shown in FIG. 2, particularly if the users know that the domains are somehow affiliated in a federated environment. In other words, users expect that organizations within a federated environment should interoperate at a much higher level than unaffiliated domains. Moreover, users generally want domains to respect their privacy. In addition, users may prefer to limit the domains that permanently store their private information, thereby limiting the effects of unauthorized disclosure of personal information, e.g., the after-effects of a domain whose security has been breached. User preferences may vary with the identity of the domain or the nature of the information that is used by the domain.

Given the preceding brief description of current technology and a few of its associated problems, the description of the remaining figures relates to federated computer environments in which the present invention may operate. Prior to discussing the present invention in more detail, however, some terminology is introduced.

A typical networked computing environment can be broadly described as comprising users and service providers. A service provider delivers some form of information, informational access, or access to resources to a user electronically via computer systems and networks, such as those shown in FIG. 1A. A user may be regarded as a consumer of the provided service. In general, many different types of service providers may be present in a given networked environment, such as the environment shown in FIG. 2. Online merchants represent a class of e-commerce service providers, while Web portals represent a class of information service providers. Internet service providers are entities that provide a network communication link to the Internet as a service.

An enterprise may be regarded as the business entity, such as a corporation, that operates a service provider. Although not meant to be limiting in the interpretation of the present invention, a service may be regarded as a defined function or a defined set of functions; the service may be made available to a user, enterprise, or other entity, or alternatively, the product of a service may be delivered to a user, enterprise, or other entity. A service provider may make a particular service available in response to a variety of circumstances: after entering into a financial or contractual agreement, after merely receiving a simple request, or after some other type of exchange. For example, some Web sites restrict access to valuable information to paying customers, whereas other Web sites operate by making content freely available to all requesting entities while interjecting advertisements into the content. With respect to the present invention, a service provider may be regarded as the data processing systems and the communication facilities that electronically deliver or make available a particular type of functionality.

In a typical computing environment, enterprises communicate with each other by adhering to communication protocols and other types of standards, but the enterprises do not necessarily agree to provide services in a common manner. Typically, an enterprise has its own user registry and maintains relationships with its own set of users; each enterprise typically has its own means of authenticating its users. In addition, each enterprise typically has its own means for managing user attribute information, as described above with respect to FIG. 2. The self-contained nature of these enterprises gives rise to the above-mentioned informational barriers within the typical computing environment.

In contrast to a typical computing environment, a federated computing environment has additional features that allow enterprises to interoperate in order to provide functionality in some common fashion. For example, a typical federation allows a union of enterprises to cooperate in a collective manner through transitive trust relationships.

Figure 3:
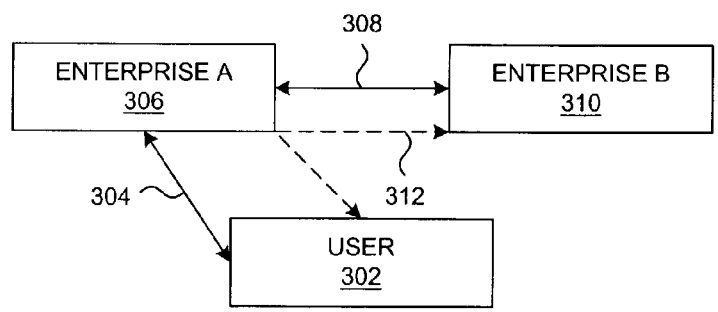
FIG. 3 is a block diagram that depicts a manner in which a set of entities can establish a typical transitive trust relationship.

With reference to FIG. 3, a block diagram depicts a manner in which a set of entities can establish a typical transitive trust relationship. If user 302 has trust relationship 304 with enterprise 306, and enterprise 306 has trust relationship 308 with enterprise 310, then user 302 may interact with enterprise 310 in some limited fashion based on trust assertion 312 from enterprise 306 to enterprise 310 on behalf of user 302.

Transitive trust relationships can be employed for various purposes, such as the transfer of authentication information, attribute information, or other types of information. Authentication is the process of validating a set of credentials that are provided by a user or on behalf of a user. Authentication is accomplished by verifying something a user knows, something a user possesses, or some characteristic about the user through a challenge/response operation using various authentication protocols. For example, verification of something that a user knows may be accomplished through a shared secret, such as a user's password as illustrated in FIG. 1D, or through something that is known only to a particular user, such as a user's cryptographic key. Verification of something that a user possesses may employ a smartcard or some other form of hardware token. Verification of a user characteristic might employ a biometric input, such as a fingerprint or a retinal map.

As a by-product of an authentication operation, an authentication token may be produced, and the authentication token can be transferred between entities as a form of proof of identity through the use of assertions. An authentication token provides direct evidence of a successful authentication operation and is produced by the entity that performs the authentication operation. A Kerberos token is one example of an authentication token that may be used in the present invention. More information on Kerberos may be found in Kohl et al., "The Kerberos Network Authentication Service (V5)", Internet Engineering Task Force (IETF) Request for Comments (RFC) 1510, September 1993.

In a trust relationship, the two entities in the relationship can rely on an assertion in a communication from the other entity as being truthful. An assertion provides indirect evidence of some previous action; for example, assertions may provide indirect evidence of previous decisions or operations concerning identity, authentication, attributes, authorization decisions, and/or other types of information. A Security Assertion Markup Language (SAML) assertion is an example of an assertion format that may be used within a federated environment. SAML has been promulgated by the Organization for the Advancement of Structured Information Standards (OASIS), which is a non-profit, global consortium. SAML is described in "Assertions and Protocol for the OASIS Security Assertion Markup Language (SAML)", Committee Specification 01, May 31, 2002, as follows:

> The Security Assertion Markup Language (SAML) is an XML-based framework for exchanging security information. This security information is expressed in the form of assertions about subjects, where a subject is an entity (either human or computer) that has an identity in some security domain. A typical example of a subject is a person, identified by his or her email address in a particular Internet DNS domain. Assertions can convey information about authentication acts performed by subjects, attributes of subjects, and authorization decisions about whether subjects are allowed to access certain resources. Assertions are represented as XML constructs and have a nested structure, whereby a single assertion might contain several different internal statements about authentication, authorization, and attributes. Note that assertions containing authentication statements merely describe acts of authentication that happened previously. Assertions are issued by SAML authorities, namely, authentication authorities, attribute authorities, and policy decision points. SAML defines a protocol by which clients can request assertions from SAML authorities and get a response from them. This protocol, consisting of XML-based request and response message formats, can be bound to many different underlying communications and transport protocols; SAML currently defines one binding, to SOAP over HTTP. SAML authorities can use various sources of information, such as external policy stores and assertions that were received as input in requests, in creating their responses. Thus, while clients always consume assertions, SAML authorities can be both producers and consumers of assertions.

Various assertion formats can be translated to other assertion formats when necessary. Authentication credentials are differentiated from an authentication assertion: authentication credentials are presented by a user as part of an authentication protocol sequence with an authentication server or service, and authentication assertions are statements about the successful presentation and validation of a user's authentication credentials, which may be subsequently transferred between entities when necessary.

Through transitive trust relationships, users in a particular enterprise can leverage relationships with a set of other enterprises through that particular enterprise's participation in a federation of enterprises. Users of multiple enterprises are able to interact with those enterprises in a common manner, thereby reducing user frustration and boosting user productivity by allowing users to learn common schemes and interfaces. For example, resource management can be performed in a common manner such that users can be granted access to resources at any of the federated enterprises as if they have a direct relationship with each enterprise. As another example, different types of resources can be personalized for the user in a common manner even though the resources are provided to the user from different enterprises.

Figure 4:
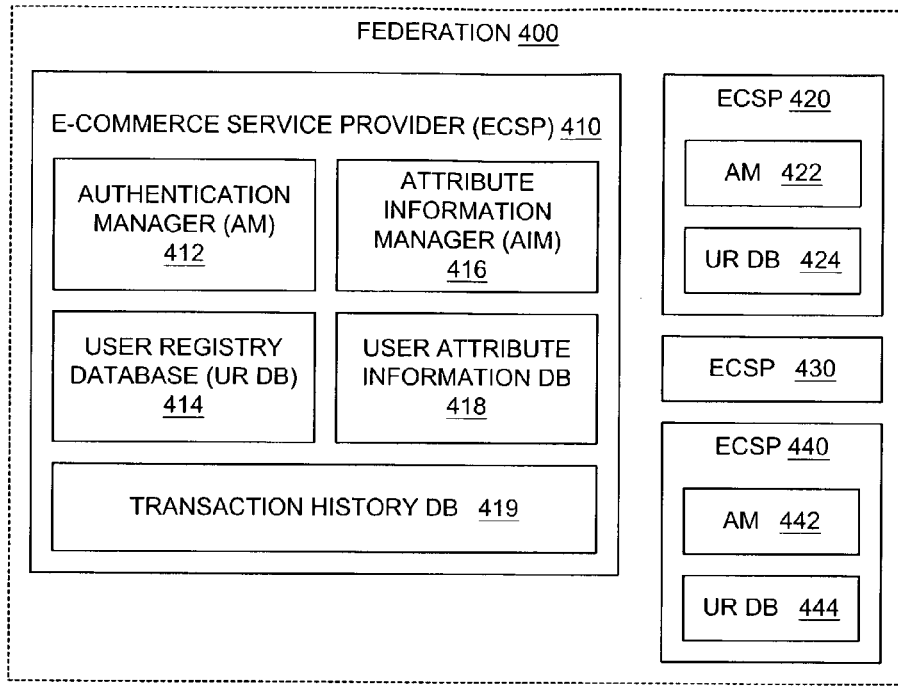
FIG. 4 is a block diagram that depicts a typical federated computing environment.

With reference now to FIG. 4, a block diagram depicts a typical federated computing environment. Since a federated computing environment is a type of computing environment, a federated computing environment can also be broadly described as comprising users and service providers. Federation 400 comprises multiple service providers. In order to facilitate the description of user transactions within a federated environment and to distinguish among various types of service providers, a particular type of service provider is primarily used within the following examples: an e-commerce service provider (ECSP). E-commerce service providers correspond to business entities that are participating in a federation; hence, it should be understood that the e-commerce service providers that are described in the following examples may represent any entity that provides a service or provides access to resources for users, which may include e-commerce entities like banks and online merchants but may include information providers or other content or service providers.

The service providers within federation 400 support a variety of functional capabilities. ECSP 410 supports authentication manager 412 for verifying the identity of users who have registered with ECSP 410 as indicated by user registry database 414. ECSP 410 also supports attribute information manager 416, which manages user attribute information that is stored in user attribute information database 418 on behalf of the registered users of ECSP 410. ECSP 410 also maintains transaction history database 419.

In a typical computing environment, a service provider requires user attribute information for a given user in order to provide some type of service for the given user. As described above with respect to FIG. 2, a service provider queries a user to obtain the required user attribute information, after which the service provider may or may not store the user attribute information. The same circumstances apply in a federated computing environment; in other words, a service provider in a federated environment may or may not have a need for user attribute information, and a service provider in a federated environment may or may not manage user attribute information by itself. In contrast with ECSP 410, ECSP 420 supports authentication manager 422 and its user registry database 424 but does not support an attribute information manager. Hence, ECSP 420 is able to provide restricted access to resources or customized user responses based upon an authenticated identity of a user but not based upon user attribute information. As an example of a more limited service provider, ECSP 430 does not support an authentication manager nor an attribute information manager, whereas ECSP 440 is similar to ECSP 420 and supports authentication manager 442 and its user registry database 444.

As in a typical computing environment, a user may register at more than one service provider or federated domain within a federated computing environment. For example, a user may be registered through the user's employer, the user's ISP, or some other service provider. Registration is an operation in which a user provides identity information to a domain in order to establish a permanent relationship with the domain; thereafter, the domain recognizes the user through some form of authentication credentials. In FIG. 4, a user may register at any domain that has the capability of registering users, such as ECSP 410, ECSP 420, or ECSP 440.

A characteristic of a federated computing environment may include the fact that one of the federated domains at which a user is registered may be considered to be the user's home domain within the federated computing environment. Any federated domain that can authenticate a particular user may be termed a home domain for the user. It is possible that there may be multiple enterprises within a federated environment that could act as a user's home domain because there may be multiple enterprises that have the ability to generate and validate authentication credentials for a user. Within the scope of a given federated session, however, there is typically only one domain that is regarded as the user's home domain.

As shown in FIG. 4, since a federated domain at which a particular user has registered does not necessarily store user attribute information, the user's home domain may or may not maintain user attribute information for the user. In other words, a home domain may be able to authenticate a user but does not necessarily store any personal information or profile information for the user other than what is required to authenticate the user.

A home domain may or may not comprise any additional functionality for asserting its status as a user's home domain in comparison with other domains; in other words, the distinction as a user's home domain may be formal or informal. As a formal example, a user may obtain Internet access from a federated ISP domain, and thereafter, the ISP domain may function as the user's home domain by providing authentication assertions to other federated domains. As an informal example, a user may frequently access a Web portal that the user considers as a primary location for receiving information and conducting online transactions. In either of these cases, the domain from which the user regards as the starting location for the initiation of most of the user's transactions within the federation may be considered by the user to be the user's home domain. Alternatively, the federation may formally designate a particular registered domain as a home domain.

In addition, a federated domain may be considered to be a user's home domain for a particular purpose. Hence, a user may have concurrent specialized home domains during a particular federated session. For example, an ISP domain may act as an authentication home domain by providing authentication assertions on behalf of a user during a given federated session, i.e. vouches for the user's identity, whereas a financial service provider like a credit card company may act as a financial home domain by providing electronic funds for online purchase transactions during the same federated session.

The establishment of trust relationships between service providers may occur primarily through out-of-band processes in which the service providers engage in various types of legal agreements with respect to the duties and liabilities of each party. It should be noted that the establishment of a trust relationship between a user and a service provider may be equivalent to a registration process, although a registration process may be only a portion of a larger process that creates a trust relationship. It should also be noted that a registration process may be completely or only partially electronic. For example, a user may be required to submit paper or electronic documents to a service provider from appropriate authorities in order to establish identity or possibly to establish legitimate possession of certain information. Hence, a portion of the registration process may be done in an out-of-band process that occurs significantly prior to the completion of the registration process.

Turning now from a description of typical federated environments to a preferred federated computing environment for supporting the present invention, in brief summary, a preferred federated computing environment facilitates the maintenance of a user's attribute information at one or more locations within a federated environment and also facilitates the subsequent use of the user's attribute information from one of those locations throughout the federated environment. From a certain perspective, this functionality may be described as distributed attribute information storage. A service provider that requires a user's attribute information can identify one of these attribute storage locations and then retrieve the user's attribute information when necessary.

In a federated environment in which the present invention operates, a user can contract with one or more attribute information providers (AIPs). Attribute information providers correspond to entities which store, manage, and retrieve attribute information for other service providers on behalf of specific users. Hence, an attribute information provider is a specialized service provider which manages user attributes as a distinct service in itself. However, it should be noted that the roles of an attribute information provider and some other type of service provider can be implemented within distinct entities or within a single entity.

A user can establish and maintain a trust relationship with one or more attribute information providers such that an attribute information provider can provide the user's attribute information to other service providers within the federated environment as required, i.e. as a service. Other service providers, such as online banks or online merchants, also maintain a trust relationship with an attribute information provider such that another service provider can trust the attribute information for a user that is provided by the attribute information provider on behalf of the user.

Figure 5:
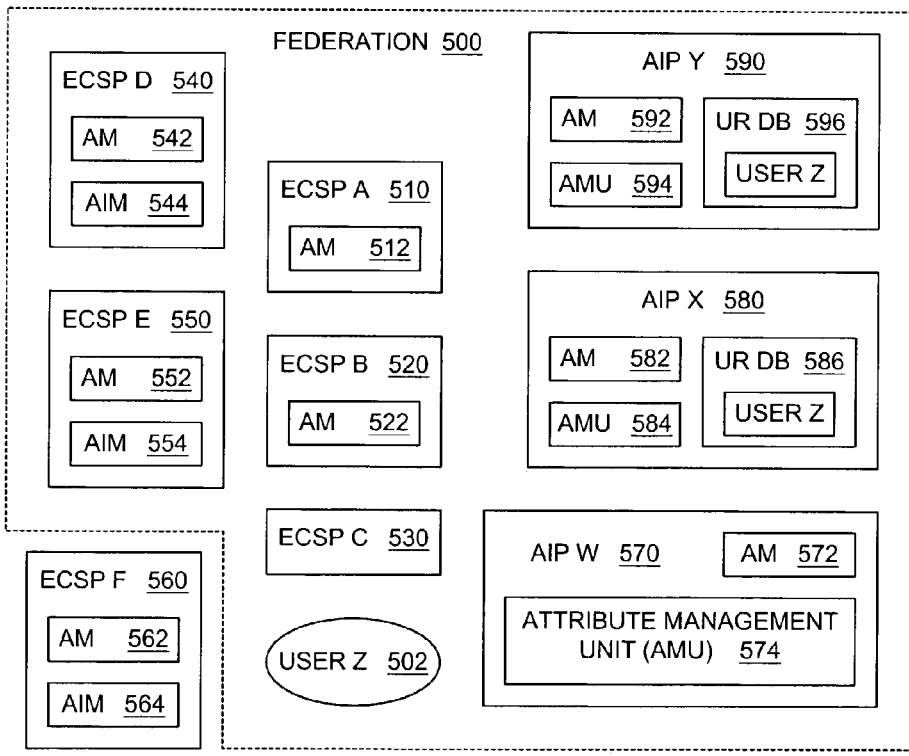
FIG. 5 is a block diagram that depicts a preferred federated environment in which the present invention may be implemented.

With reference now to FIG. 5, a block diagram depicts a preferred federated environment in which the present invention may be implemented. Federated environment 500 comprises multiple users and multiple services. The users of the federation are represented by user 502, who interacts with service providers that are inside or outside the federated computing environment through the use of a client device (not shown) in a manner similar to that described in FIGS. 1A-3.

Typical federated service providers are represented by e-commerce service providers in FIG. 5. In a manner similar to that already described above with respect to FIG. 4, these e-commerce service providers (ECSPs) may comprise the ability to authenticate both federated and non-federated users through the inclusion of an authentication manager (AM) and its associated databases. In addition, these e-commerce service providers may comprise the ability to manage user attribute information through the inclusion of an attribute information manager (AIM) and its associated databases. In the example shown in FIG. 5, ECSP 510 comprises AM 512, and ECSP 520 comprises AM 522; hence, these e-commerce service providers do not manage user attribute information. ECSP 530 comprises neither an authentication manager nor an attribute information manager. In contrast, ECSP 540 comprises AM 542 and AIM 544, and ECSP 550 comprises AM 552 and AIM 554, so these e-commerce service providers are able to perform authentication operations and to manage user attribute information for users, whether those users are considered to be federated users or non-federated users.

ECSPs 510, 520, 530, 540, and 550 are shown in FIG. 5 as participating in federation 500 because they share some type of common functionality based on previously established trust relationships. Although each and every e-commerce service provider does not necessarily have a trust relationship with every other e-commerce service provider, the e-commerce service providers have a framework or network of trust relationships that warrant their inclusion in federation 500. In contrast, ECSP 560 comprises AM 562 and AIM 564 in order to be able to perform authentication operations and to manage user attribute information for users, but ECSP 560 is not included within federation 500 because it does not have any previously established trust relationships with any other service providers within federation 500. In the example of FIG. 5, user 502 is shown as included within federation 500 because user 502 has at least one trust relationship with at least one service provider within federation 500, although user 502 may interact with federated and non-federated service providers.

The differences between a typical federated computing environment as shown in FIG. 4 and a federated computing environment as shown in FIG. 5 in which the present invention may be deployed are apparent with respect to FIG. 5, which depicts a set of attribute information providers. As mentioned above, a user can contract with one or more attribute information providers in a federated environment, and the attribute information providers (AIPs) manage user attributes as a distinct service in itself, although this service may be offered in conjunction with other services by single enterprise. Compared with federation 400 in FIG. 4, federation 500 in FIG. 5 comprises attribute information providers as distinct service providers.

In particular, AIP 570 comprises AM 572 and attribute management unit (AMU) 574. An attribute management unit includes any supporting databases, such as user registry databases (not shown), and it is similar to the attribute information managers that are supported by the federated e-commerce service providers, but an attribute management unit also includes additional functionality for performing the operations of the present invention as described in more detail further below.

Federation 500 also includes AIP 580, which supports AM 582 and AMU 584 in a manner similar to AIP 570. In the example shown in FIG. 5, user 502 is a registered user of AIP 580, as reflected by the inclusion of information about user 502 in user registry database 586 that is managed by AIP 580. The establishment of a trust relationship between an attribute information provider and a user would be primarily an out-of-band process by which the user registers or subscribes with an attribute information provider that stores, maintains, and releases the user's attribute information. In this example, user 502 has previously contracted with AIP 580 to establish a trust relationship with AIP 580 so that AIP 580 may provide user attribute information to other service providers on behalf of user 502. Likewise, AIP 590 supports AM 592 and AMU 594, which manages user attribute information for user 502 as reflected by that user's registration in user registry database 596.

A user may contract with an attribute information provider for the release of attributes in different contexts. For example, a user might require explicit user approval for the release of certain attribute information, while in other cases, the user may allow attributes to be released without requiring user intervention. These preferences may vary with the identity of the e-commerce service provider that is requesting the release of the user's attributes. An attribute information provider may store these user preferences as an attribute release policy in association with the values of the user attributes within a database that is maintained by the attribute information provider. Hence, an attribute information provider may optionally present an interface for a user to create attribute release policies when a user registers for the attribute information service or when a user updates the user's attribute information.

An e-commerce service provider may have previously established a trust relationship with at least one attribute information provider and possibly a plurality of attribute information providers, which would also be primarily an out-of-band process. An e-commerce service provider may contract for different levels of attribute information services. It should be understood that the present invention is able to interoperate with a variety of underlying attribute dissemination schemes. As part of the process of establishing a trust relationship, the e-commerce service provider and the attribute information provider would engage in an out-of-band exchange of information that is used to establish a trust relationship, which may include a shared secret key, digital certificates, or some other form of information. This information is used to protect user attribute information that is presented to the e-commerce service provider by the attribute information provider during a user transaction.

As shown in the example of FIG. 5, the user may have previously established a trust relationship with a plurality of attribute information providers. As noted above, a federated service provider may be considered to be a user's home domain for a particular purpose; in other words, a user may have concurrent specialized home domains during a particular federated session, i.e. user session for one or more transactions or operations within a federated computing environment. If the user has registered with multiple attribute information providers, then one of those attribute information providers would be considered to be the user's attribute home domain for a particular federated session. Concurrently, another service provider that is providing authentication assertions on behalf of the user during the same session may be considered to be the user's authentication home domain for that session. The labeling of these different home domains may be formally supported within the federation, although the following examples use these terms more as naming conventions in order to facilitate a description of the operations that occur among many service providers or domains during the processes of the present invention that are described with respect to the remaining figures hereinbelow.

Turning now to an abbreviated summary of the present invention, the present invention is directed to processes for enrolling information about a user's attribute information provider with other service providers. A process of generic enrollment can be contrasted with a process of generic registration, which is an operation in which user identity information is provided to a domain in order to establish an authentication relationship with the domain; in other words, a generic registration operation allows a domain to store user information such that the domain can thereafter verify or authenticate the identity of its registered users. In contrast, a generic process of enrollment is an operation in which some information about a particular user is provided to a domain, usually by another domain; preferably, an enrollment operation occurs between two domains that have a trust relationship. The enrollment operation may or may not involve an identifier for the user because the enrollment operation may be performed in a manner in which the enrolling domain regards the requesting party as a generic user. In this manner, generic enrollment operations can be interpreted as a subset of generic registration operations because they are similar in the fact that an operation is performed with some form of user information for a given user on behalf of that given user. In light of this distinction, the present invention is specifically directed to enrolling information about a given user's attribute information providers; the service providers at which the user becomes enrolled may be federated or non-federated service providers, and the enrollment process of the present invention may occur in a manner which may or may not include a user identifier for that particular user.

More specifically, the present invention is directed to a process for disseminating the location, path, Uniform Resource Identifier (URI), or some other type of identifier of a particular user's attribute information provider/providers to other service providers. When a service provider receives this information during an enrollment operation, the service provider stores the information in some persistent manner such that the information is available to the service provider or such that the information is retrievable by the service provider. As noted previously, when a user attempts to move from one service provider to another service provider within the Internet or World Wide Web by accessing resources at the different service providers, a user may be subjected to multiple requests for user information, which can significantly slow the user's progress through a set of transactions. With the present invention, the user can enroll information about the user's attribute information service provider/providers at multiple domains that the user expects to visit in the future. When the user does visit one of these service providers, the service provider has information about the user's attribute information provider from which the service provider can retrieve user attribute information. The present invention is now described in more detail hereinbelow.

Figure 6A:
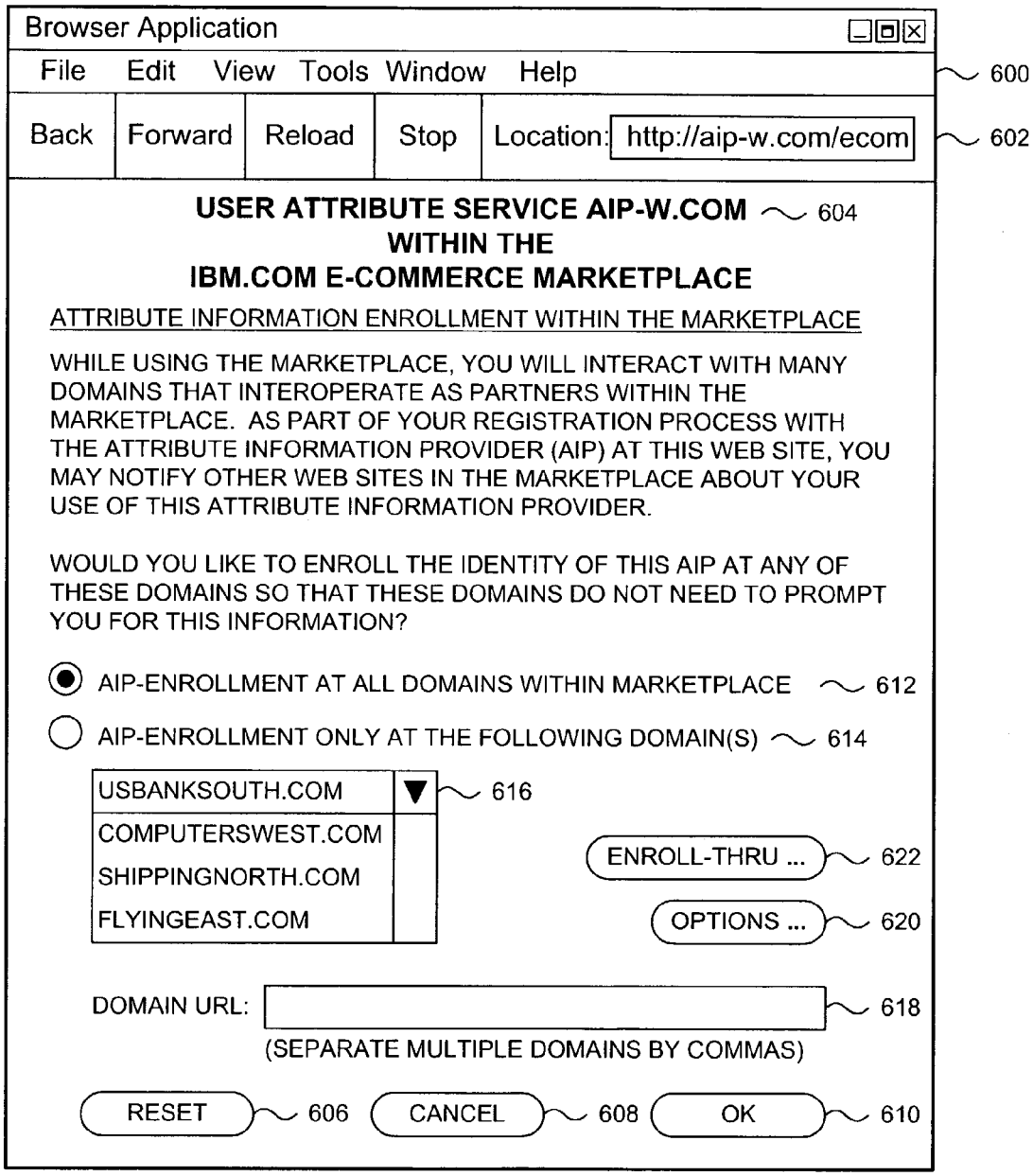
FIG. 6A is a graphical user interface window which shows a set of selectable options that are presented to a user by an attribute information provider that allows a user to initiate an enrollment operation for the user's AIP information at e-commerce service providers within a federated environment.

With reference now to FIG. 6A, a graphical user interface (GUI) window is shown in which selectable options are presented to a user by an attribute information provider that allows a user to initiate an enrollment operation for the user's AIP information at e-commerce service providers within a federated environment. In the example shown in FIG. 6A, the federation is an electronic marketplace of many e-commerce service providers. The GUI window that is shown in FIG. 6A could be presented to a user by any federated domain for which it would be appropriate to allow a user to initiate an enrollment process; in most scenarios, the presenting domain would be a domain that can verify the identity of the user, and most likely, the presenting domain would be a home domain for a given user session. In the example shown in FIG. 6A, the presenting domain is an attribute information provider, and the attribute information provider is allowing a user to initiate an enrollment process, i.e. an AIP-enrollment process, in the context of a larger registration process that the user is completing with the attribute information provider. For ease of differentiation among many domains in the following examples, the attribute information provider will be referred to as the user's attribute home domain. Alternatively, the presenting domain could be a user's authentication home domain through which the user performs many different types of federated operations. More complex scenarios are described in other examples further below.

Window 600 is a typical browser application window that a user may have used to access other Web pages at the user's attribute home domain. In most Web environments, the controls that are shown in window 600 would likely be presented in the form of an HTML-formatted document, i.e. Web page, that can be presented by a browser application that is executing on a client device that is being operated by the user. Toolbar 602 contains typical controls for use within the browser application window. The name of the home domain is shown at the top 604 of the content area of window 600. "Reset" button 606 clears the selected values or returns the values to default values. "Cancel" button 608 allows a user to cancel the AIP-enrollment process, and "OK" button 610 submits the user's choices to continue the AIP-enrollment process.

Window 600 may be presented to a user when the user has requested to complete an AIP-enrollment process from the user's attribute home domain or when the attribute home domain has determined that the user should complete an AIP-enrollment process. As is well-known, a set of radio buttons allows a user to select only one of the options that are presented within the set of radio buttons. Radio button 612 indicates that the user wishes to complete the AIP-enrollment process with respect to all domains within a federation, which requires a group or multi-domain AIP-enrollment process. Radio button 614 indicates that the user wishes to complete the AIP-enrollment process with respect to one or more domains within the federation, which may require a single-domain AIP-enrollment process or a multi-domain AIP-enrollment process.

Drop-down menu 616 allows a user to select the one or more domains at which the user wishes to enroll the user's AIP information; in a well-known manner, the user selects multiple menu items by holding a special selection key while choosing a menu item with a mouse button. The domains that appear in drop-down menu 616 may be all of the domains within the e-commerce marketplace or federation, all federated domains with which the user's attribute home domain has trust relationships, or some other set of federated or non-federated domains. Text entry field 618 allows a user to enter one or more Uniform Resource Locators (URLs) for domains at which the user wishes to enroll the user's AIP information. Other information entry or selection mechanisms may also be supported.

If the user selects "Option" button 620, a dialog box appears that allows the user to select processing option flags. As explained in more detail further below, the selected choices can be used by the user's attribute home domain to control various processing options during the AIP-enrollment process or passed to the domains at which the user wishes to enroll so that those domains can control various processing options while they are performing the AIP-enrollment operation. If the user selects "Enroll-thru" button 622, then the attribute home domain sends a request to another domain in order to have the AIP-enrollment operation initiated by that other domain, as explained in more detail further below.

As mentioned above, window 600 could be presented to a user in the context of a larger registration process that the user is completing with an attribute information provider, in particular, the user's attribute home domain. Window 600 could also be presented to the user in response to a user action, e.g., after the user has explicitly accessed a particular resource, such as after selecting a hyperlink to a particular Web page or after the user has visited the attribute information provider to update the user's attribute information, e.g., to add or modify a phone number.

Figure 6B:
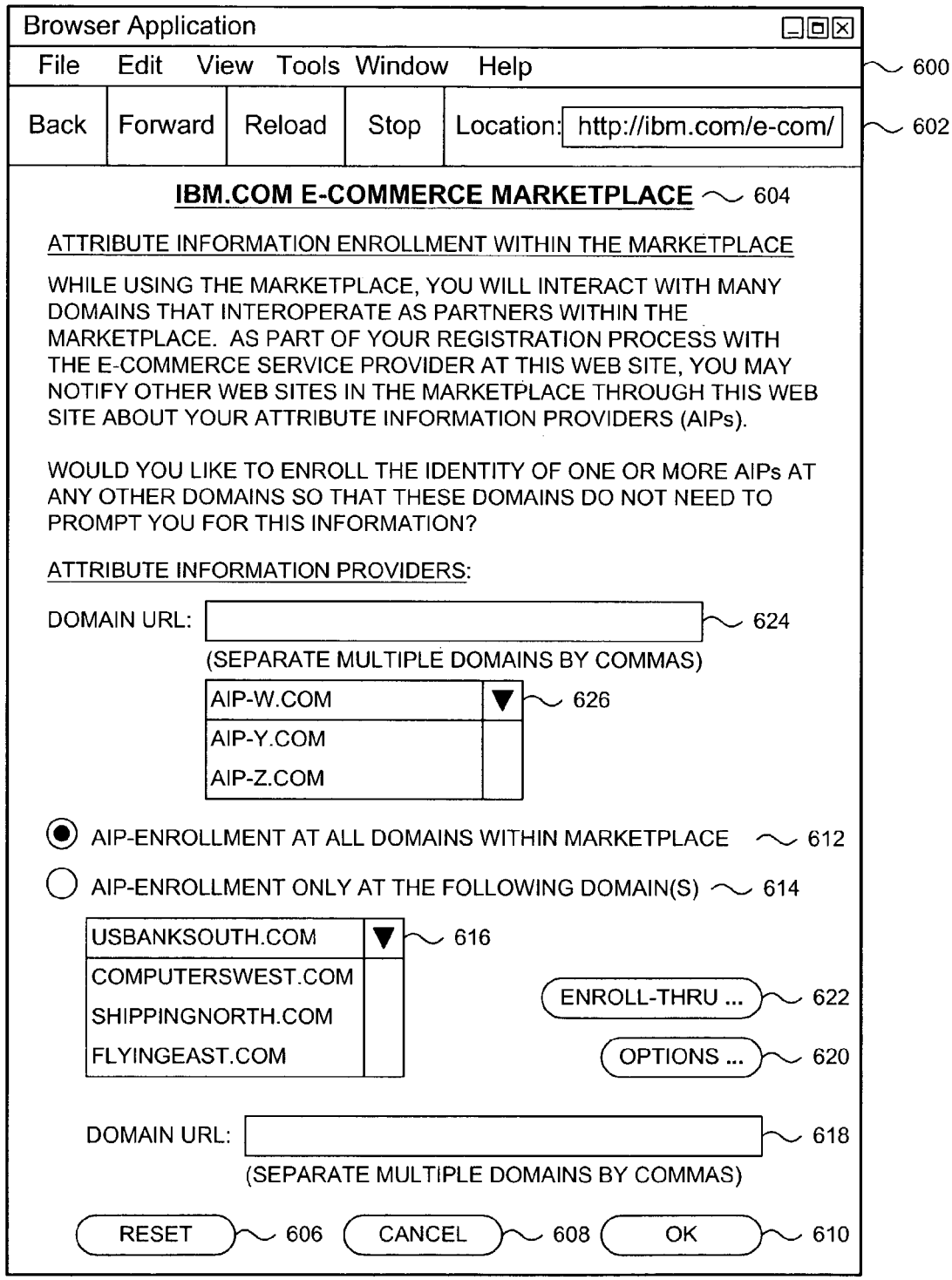
FIG. 6B is a graphical user interface window which shows a set of selectable options that are presented to a user by an e-commerce service provider that allows a user to initiate an enrollment operation for the user's AIP information at other e-commerce service providers within the federated environment.

With reference now to FIG. 6B, a graphical user interface window is shown in which selectable options are presented to a user by an e-commerce service provider that allows a user to initiate an enrollment operation for the user's AIP information at other e-commerce service providers within the federated environment. FIG. 6B is similar to FIG. 6A, and similar numerals are used to label similar elements in both figures. Given that a user's attribute home domain, i.e. an attribute information provider, is initiating the AIP-enrollment process that is shown in FIG. 6A, the identity of the attribute information provider is known.

As mentioned above, however, the AIP-enrollment process could be initiated at some other type of home domain. In the example shown in FIG. 6B, the presenting domain is an e-commerce service provider, such as an authentication home domain. In this case, the authentication home domain may not know the attribute information providers that are used by the user, and the user may need to inform the home domain of all, or a subset, of the identities or domain names of the attribute information providers at which the user is registered. In FIG. 6B, the e-commerce service provider is allowing a user to initiate an enrollment process, i.e. an AIP-enrollment process, in the context of a larger registration process that the user is completing with the e-commerce service provider.

Hence, in FIG. 6A, the user's attribute home domain is initiating an AIP-enrollment operation in which it assumes that it is the only attribute information provider that is used by the user, whereas in FIG. 6B, another type of home domain queries the user for the identities of the user's attribute information providers. However, the example in FIG. 6A could be extended so that the user's attribute home domain queries the user to enter or select any other attribute information providers at which the user is also registered.

In the example shown in FIG. 6B, window 600 also includes text entry field 624 and drop-down menu 626 for allowing a user to enter or select the domain names of the attribute information providers that the user wishes to identify during the AIP-enrollment operation; drop-down menu 626 may contain a set of attribute information providers within the federated marketplace that are known to, or trusted by, the e-commerce service provider that is presenting window 600. Although not shown in window 600, the user may be provided with controls for setting a priority level for each attribute information provider such that each attribute information provider has a user-specified preferred ranking among the set of indicated attribute information providers, which has significance that is explained in more detail further below with respect to FIG. 9.

FIG. 6A and FIG. 6B depict different home domains that act as origination points for an AIP-enrollment process. In the following examples, the user's home domain could be an authentication home domain, an attribute home domain, or some other type of home domain. Hence, some of the examples merely refer to a home domain, but when necessary, a specific type of home domain is discussed.

FIG. 6A and FIG. 6B depict examples in which the user is provided significant freedom to identify attribute information providers and to choose the domains at which the user wishes to enroll the user's AIP information. In alternative embodiments, the user may be much more restricted. For example, the domains at which the user may perform enrollment operations may be administratively pre-determined or pre-configured for the user based on various policies, such as membership within a certain user group, some other user attribute, or the decisions of the home domain.

If the user chooses one of the AIP-enrollment options that are shown in FIG. 6A or FIG. 6B, then the user's home domain initiates the AIP-enrollment operation. As mentioned above, when a service provider receives the user's AIP-enrollment information during an enrollment operation, the service provider stores the information in some persistent manner such that the information is available to the service provider or is retrievable by the service provider. As explained in more detail further below, a persistent AIP domain identity token is generated and stored by the service provider; the persistent AIP domain identity token is then available or retrievable when the user attempts to access a resource at the service provider.

Preferably, a service provider generates an AIP domain identity token as requested, i.e. in response to an AIP-enrollment request message, because the service provider has a trust relationship with the domain that is requesting the AIP-enrollment operation. Otherwise, the service provider that is generating the token may be performing operations in response to malicious requests or for entities that do not have authority to make such requests. Moreover, a home domain that is initiating the AIP-enrollment operation should preferably send a user's AIP information only to those domains that the home domain knows will not use the information in a malicious manner, i.e. trusted domains. More importantly, the service provider might be allowing a malicious user or domain to divert the service provider from a legitimate manager of a particular user's attribute information.

This preferred requirement is particularly true for service providers that employ server-side datastores for maintaining an AIP domain identity token for a user. If the service provider could not verify the trustworthiness of a requesting domain, then the service provider might store a bogus AIP domain identity token in its own databases. These bogus tokens would waste resources by consuming space in the database, and the service provider would have difficulty purging the bogus tokens because the service provider would not have a mechanism for subsequently distinguishing bogus tokens and valid tokens.

The present invention may operate through HTTP messages and responses, and an AIP domain identity token may be stored by a service provider as an HTTP cookie, i.e. an AIP domain identity cookie, in a cookie cache at a user's client device through the use of an HTTP redirection message via the user's browser. However, it should be noted that the present invention may employ other communication protocols and/or other storage mechanisms, such as other client-side or server-side datastores. The actual AIP-enrollment processes are now described in more detail below with respect to FIGS. 7A-7G.

With reference now to FIG. 7A, a flowchart depicts a group or multi-domain AIP-enrollment process. At some point in time, a user's home domain may determine that the user should complete a multi-domain AIP-enrollment process, also referred to herein as a group AIP-enrollment process. In one embodiment, the home domain may present a graphical user interface window, such as that shown in FIG. 6A or FIG. 6B, to the user to request permission for the completion of the AIP-enrollment process. In another embodiment, the user may request to complete the AIP-enrollment process through a similar user interface. In the example shown in FIG. 7A, a user specifically requests to complete the AIP-enrollment process. It may be assumed that the home domain has already authenticated the user's identity.

The process begins with a user accessing a resource that generates a request to complete a multi-domain AIP-enrollment process through the user's home domain (step 702), e.g., a selection of option 612 in the Web page shown in window 600 in FIG. 6A. The home domain verifies through an access control decision that the user is authorized to request a multi-domain AIP-enrollment process (step 704). If the user is not authorized, then the home domain can send a response to the user explaining why the user is not authorized to complete the requested operation.

Assuming that the user is authorized, then the home domain retrieves federation resource information that indicates a list of e-commerce service providers, content providers, or other such domains within the federation (step 706). In one embodiment, the home domain may employ a list of all service providers in the federation. In alternative embodiments, the home domain uses a subset of federated domains or a set of domains that were provided by the user. In the example in FIG. 7A, the home domain narrows the list of federation domains to those domains that require user attribute information for the user when responding to resource requests, e.g., e-commerce transactions, from the user (step 708). In accordance with the present invention, information about the identities of the attribute information providers that maintain information for the user is then pre-established or enrolled at those domains through the operations shown in the flowchart of FIG. 7C.

The home domain performs the enrollment operation by looping through the list of domains. The home domain obtains the next domain in the list of domains that was generated at step 708 (step 710) and completes an AIP-enrollment operation at this domain (step 712); the AIP-enrollment operation is explained in more detail with respect to FIG. 7C. If there are more domains in the list at which the user has not been enrolled, then the process branches back to step 710 to complete the AIP-enrollment process at the next domain (step 714). If all of the domains in the list have been processed, then the home domain sends an AIP-enrollment completion response to the user (step 716), and the process is complete.

In this manner, a set of federated or non-federated domains receives the user's AIP information. For example, each domain within the federation at which the user might eventually request resources can learn about the user's attribute information providers. The user may be fully enrolled or partially enrolled; the example in FIG. 7A assumes that the AIP-enrollment at each domain is successful. If an AIP-enrollment fails, then the behavior of the home domain may be configurable so that it re-attempts the AIP-enrollment immediately or at a future point in time, reports failure to the user or an administrator, or some other action.

With reference now to FIG. 7B, a flowchart depicts a single-domain AIP-enrollment process. FIG. 7B is similar to FIG. 7A. In one embodiment, the home domain may present a graphical user interface window, such as that shown in FIG. 6A, to the user to request permission for the completion of the AIP-enrollment process. In another embodiment, the user may request to complete the AIP-enrollment process through a similar user interface. In the example shown in FIG. 7B, a user specifically requests to complete the AIP-enrollment process. It may be assumed that the home domain has already authenticated the user's identity.

The process begins with a user accessing a resource that generates a request to complete a single-domain AIP-enrollment process through the user's home domain (step 722), e.g., a selection of a single domain through option 614 in the Web page shown in window 600 in FIG. 6A. The home domain verifies through an access control decision that the user is authorized to request a single-domain AIP-enrollment process (step 724). If the user is not authorized, then the home domain can send a response to the user explaining why the user is not authorized to complete the requested operation.

Assuming that the user is authorized, then the home domain retrieves the identity of the domain for the AIP-enrollment operation (step 726). This may be a domain that was selected by the user, e.g., a selection within drop-down menu 416 in the Web page shown in window 600 in FIG. 6A. The home domain then completes an AIP-enrollment operation at the appropriate domain (step 728); the AIP-enrollment operation is explained in more detail with respect to FIG. 7C. Assuming that the AIP-enrollment operation is successful, then the home domain sends an AIP-enrollment completion response to the user (step 730), and the process is complete.

Figure 7C:
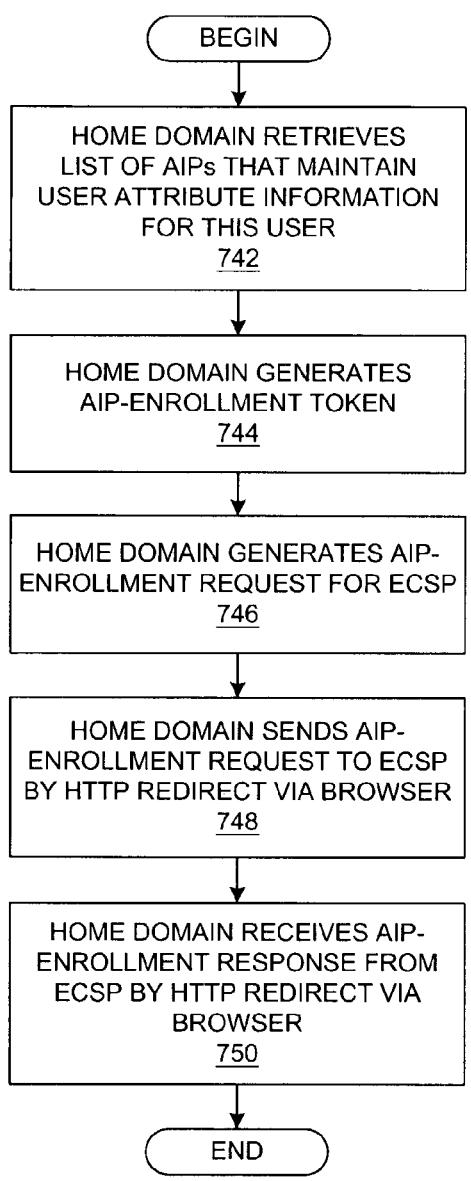
FIG. 7C is a flowchart that depicts further detail for the AIP-enrollment operation from the perspective of the home domain.

With reference now to FIG. 7C, a flowchart depicts further detail for the AIP-enrollment operation from the perspective of the home domain. FIG. 7C provides further detail for step 712 in FIG. 7A and for step 728 in FIG. 7B. The process begins with the home domain retrieving a list of attribute information providers that maintain user attribute information for this user (step 742). The home domain may have acquired this information in a variety of ways; for example, the home domain may have prompted the user to provide the identities of some or all of the attribute information providers at which the user is registered, or the home domain may have assisted the user in registering with attribute information providers within the federated environment. Alternatively, the user may be permitted or assumed to be enrolled at only one attribute information provider or only a set of attribute information providers within a federation. As another alternative, the home domain may be an attribute home domain that assumes that it is the only attribute information provider at which the user is registered such that the attribute information provider only identifies itself during the AIP-enrollment operation. The present invention should not be interpreted as being limited in the manner in which a list of one or more attribute information providers originates.

The home domain then generates an AIP-enrollment token for the user that indicates the user's AIP information (step 744). The home domains generates an appropriate AIP-enrollment request for the domain that is receiving the user's information (step 746), i.e. the domain at which the user is being AIP-enrolled, such as a domain that was determined at step 710 in FIG. 7A or step 726 in FIG. 7B. The AIP-enrollment request message contains the AIP-enrollment token, as explained in more detail below with respect to FIG. 7D.

The home domain then sends the AIP-enrollment request message to the appropriate domain via the user's browser (step 748), e.g., as an HTTP redirect message, although other communication protocols may be employed by the present invention. At some subsequent point in time, the home domain receives an AIP-enrollment response message from the domain via the user's browser (step 750). The home domain may analyze a status code or other indicator to determine whether the AIP-enrollment request was successful or unsuccessful. An application that is providing the functionality for the home domain could be implemented with an event queue such that messages can be sent and received asynchronously; after sending the AIP-enrollment request message, the application would not have to wait for the return of a corresponding AIP-enrollment response message because the application could perform other actions during this time period.

Figure 7D:
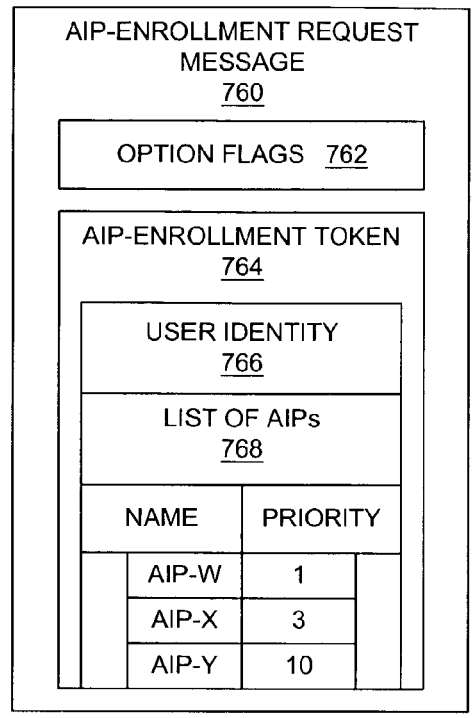
FIG. 7D is a block diagram that depicts an AIP-enrollment request message.

With reference now to FIG. 7D, a block diagram depicts an AIP-enrollment request message. AIP-enrollment request message 760 comprises option flags 762 that indicate AIP-enrollment processing options that were chosen by the user or by the home domain. AIP-enrollment request message 760 also comprises AIP-enrollment token 764 that was generated by the home domain. AIP-enrollment token 764 optionally contains user identity 766. Assuming that the home domain has already authenticated the user, and also assuming that the home domain and the e-commerce service provider that receives the AIP-enrollment request have a trust relationship within a federated environment, the e-commerce service provider can trust the user identity information that it receives from the home domain. If the home domain and the e-commerce service provider that receives the AIP-enrollment request do not have a trust relationship within a federated environment, then the e-commerce service provider may choose whether or not to accept the AIP-enrollment request. In any case, the AIP-enrollment token should by cryptographically protected because it could be spoofed; if it was hijacked in some manner, a malicious user could modify the contents and disrupt the information in various ways.

AIP-enrollment token 764 also contains list 768 that indicates the attribute information providers that manage attribute information on behalf of the identified user. The list comprises the names or identities of those attribute information providers along with priorities that are associated with each attribute information provider. The attribute information providers can be prioritized such that attribute information providers are contacted in a preferred order to retrieve the user's attribute information, as explained in more detail further below with respect to FIG. 9. An identity of an attribute information provider may be specified by using its domain name, a URI, or some other form.

User identity 766 is optional within AIP-enrollment token 764 because it may not be necessary for the service provider at which the user is being enrolled to know the user's identity, at least for the purpose of completing the AIP-enrollment operation. If the service provider is setting an AIP domain identity token as an HTTP cookie, then the service provider can store the HTTP cookie in the user's cookie cache, and a user identifier is not required for storing and retrieving the cookie. In contrast, if the AIP domain identity token is being managed in a server-side datastore, then the user's identity may be required to store and retrieve the proper AIP domain identity token in relation to the user's identity. The service provider and the home domain may be able to exchange and interpret a user's identity based on a common identity management scheme within a federation.

Figure 7G:
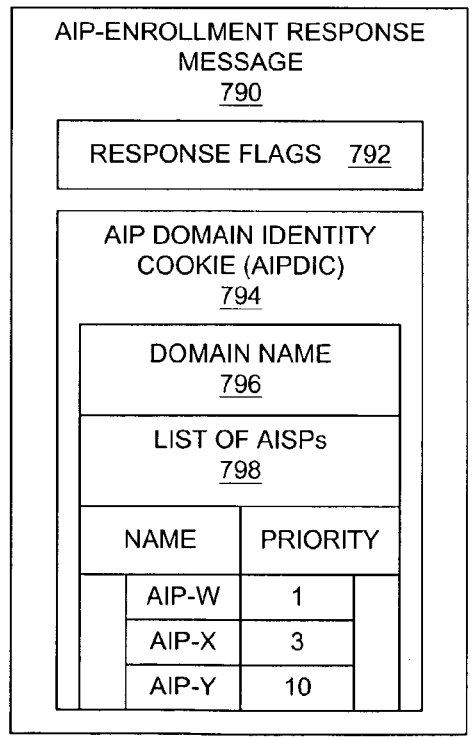
FIG. 7G is a block diagram that depicts an AIP-enrollment response message.
Figure 7E:
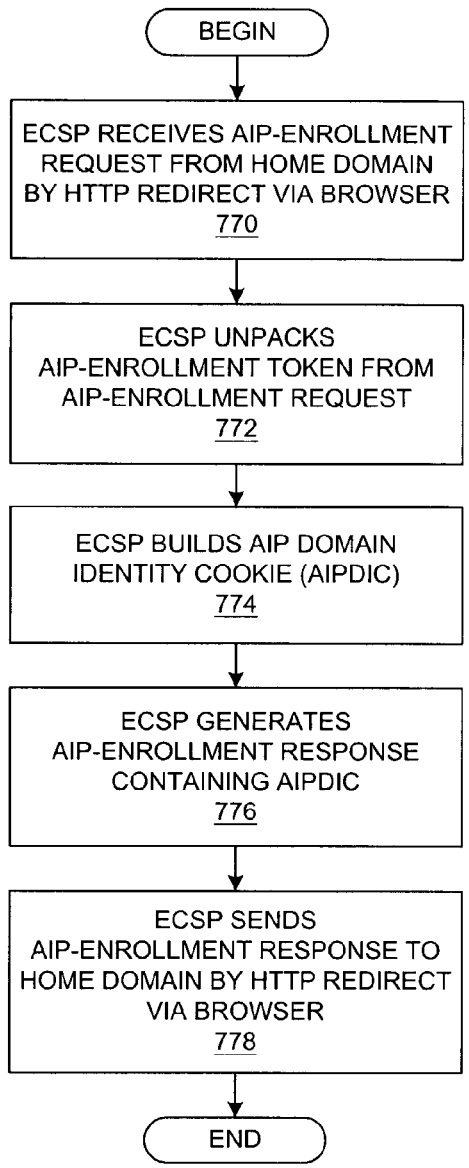
FIG. 7E is a flowchart that depicts the processing that occurs at a service provider when it receives an AIP-enrollment request from a user's home domain.

With respect now to FIG. 7E, a flowchart depicts the processing that occurs at a service provider when it receives an AIP-enrollment request from a user's home domain. The processing that is shown in FIG. 7E occurs during the time period when the home domain waits for the AIP-enrollment response message, as shown between steps 748 and 750 in FIG. 7C.

The process begins with the e-commerce service provider receiving the AIP-enrollment request message from the home domain via the user's browser, e.g., as an HTTP redirect message (step 770). The e-commerce service provider unpacks the AIP-enrollment token from the AIP-enrollment request message (step 772). To protect the message contents, the e-commerce service provider and the home domain may have a trust relationship in which they share a secret key that is used for various purposes, as mentioned above, e.g., encrypting and decrypting the AIP-enrollment token.

The e-commerce service provider then builds a persistent AIP domain identity token (step 774), such as an AIP domain identity cookie (AIPDIC), which contains the list of attribute information providers for the associated user. The e-commerce service provider also generates an AIP-enrollment response (step 776), and assuming that the domains are using HTTP messages, then the response messages contains the persistent AIP domain identity token. The AIP-enrollment response is sent to the user's home domain via the user's browser, e.g., as an HTTP redirect message (step 778), and the process is complete. If the user already has an AIP domain identity token that has been generated by the e-commerce service provider, then this information may be appended to the existing AIP domain identity token instead of generating a new token, as explained in more detail further below.

Figure 7F:
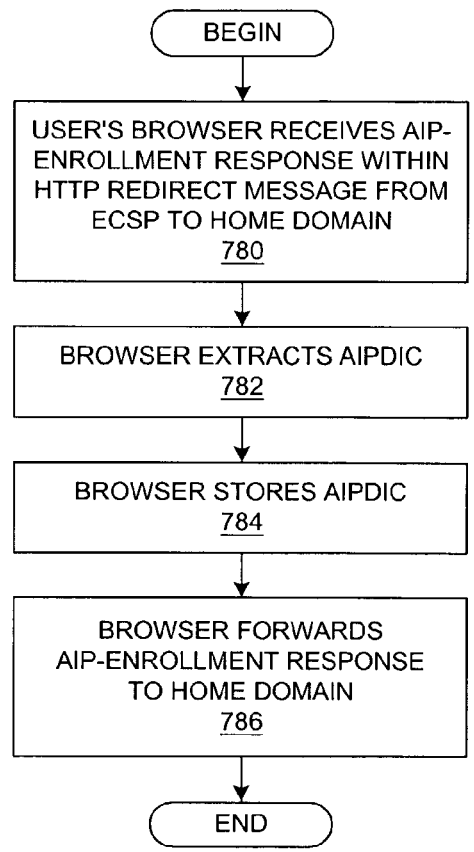
FIG. 7F is a flowchart that depicts the processing that occurs at a user's client when it receives an AIP-enrollment response from a domain that has participated in the AIP-enrollment operation.

With respect now to FIG. 7F, a flowchart depicts the processing that occurs at a user's client when it receives an AIP-enrollment response from a domain that has participated in the AIP-enrollment operation. The processing that is shown in FIG. 7F occurs during the time period when the home domain waits for the AIP-enrollment response message, as shown between steps 748 and 750 in FIG. 7C, or after the domain has sent the AIP-enrollment response to the home domain via the user's browser, shown as step 778 in FIG. 7E.

The process begins when the browser application, which is executing on the client device and which is operated by the user, receives the AIP-enrollment response from the enrolled domain, i.e. the e-commerce service provider at which the user's AIP information was enrolled (step 780). The e-commerce service provider has completed a requested AIP-enrollment operation and has returned the AIP-enrollment response to the user's home domain via the user's browser, e.g., as an HTTP redirect message. In this example, the AIP-enrollment response contains an AIP domain identity token, which is an HTTP cookie, plus AIP-enrollment status that indicates success, failure, other completion codes, and/or other information.

In accordance with HTTP specifications, the browser extracts the AIP domain identity cookie (step 782) and locally stores the AIP domain identity cookie in an appropriate cookie cache or cookie file (step 784). The browser then forwards the AIP-enrollment response message to the user's home domain (step 786), and the AIP-enrollment operation is complete with respect to the user's client.

As previously mentioned above, it should be noted that other storage mechanisms may be employed. While the example in FIG. 7E and FIG. 7F describes the storage of the AIP domain identity token as an HTTP cookie in a client-side cookie cache, the e-commerce service provider could store the AIP domain identity token or the location of one or more of the user's attribute information providers in a server-side database, such as a user registry database similar to those described above with respect to FIG. 5, or some other form of user account, user record, user profile, or other server-side information repository. A server-side information repository enables the e-commerce service provider to restore the location of a user's AIP information to a client-side information repository, such as a cookie within a cookie cache, if the client-side information repository is purged, e.g., when the user clears the browser's (or client device's) cookie cache in which an AIP domain identity cookie has been previously stored.

With reference now to FIG. 7G, a block diagram depicts an AIP-enrollment response message. AIP-enrollment response message 790 comprises response flags 792 that indicate whether the AIP-enrollment request was successful, unsuccessful, or other completion codes. AIP-enrollment response message 790 also comprises AIP domain identity token 794 that was generated by an e-commerce service provider when an AIP-enrollment operation was completed by the e-commerce service provider. AIP domain identity token 794 contains domain name 796 of the e-commerce service provider that generated the token. AIP domain identity token 794 also contains list 798 that indicates the attribute information providers that manage attribute information on behalf of the identified user; the list comprises identifiers for those attribute information providers along with priorities that are associated with each attribute information provider. Other optional information could be present within the AIP domain identity token.

The list in the AIP-enrollment response may be formatted differently from the list in the AIP-enrollment request. The format of the AIP domain identity token, such as an AIP domain identity cookie, is not critical to the operation of the present invention. As an example, the AIP domain identity token may be generated as a character string, such as:

$$AIPDIC(ECSP.COM) := \begin{array}{l} \{AIP = AIP - W.COM; \text{PRIORITY} = 1; \\ AIP = AIP - X.COM; \text{PRIORITY} = 3; \\ AIP = AIP - Y.COM; \text{PRIORITY} = 10\} \end{array}$$

This character string identifies the domain of the e-commerce service provider that generated the AIP domain identity cookie, i.e. "ECSP.COM", and a set of attribute information provider domain names, i.e. "AIP-W.COM", "AIP-X.COM", and "AIP-Y.COM", and their associated priorities. An AIP domain identity token may or may not be encrypted, but the management of these tokens is significantly simplified if they remain unencrypted because of encryption key management issues, although an AIP domain identity token may be protected by a keyed hash to provide integrity on the data.

The processes that are shown in FIGS. 7A-7C, FIG. 7E, and FIG. 7F generate and store an AIP domain identity token before it is needed by an e-commerce service provider or similar federated domain. In the example of an HTTP cookie, because the user's browser sends the cookie with all HTTP requests to the e-commerce service provider's domain (along with any other cookies associated with the e-commerce service provider's domain), the e-commerce service provider receives the cookie with each request. The AIP domain identity token is readily available when the user attempts to access the resource at the e-commerce service provider. Therefore, the e-commerce service provider does not need to prompt the user for the identity of an attribute information provider from which to retrieve the user's attribute information. In this manner, the user's interaction with the e-commerce service provider is less tedious and more efficient. The use of an AIP domain identity token is described in more detail with respect to FIG. 8 and FIG. 9.

Figure 8:
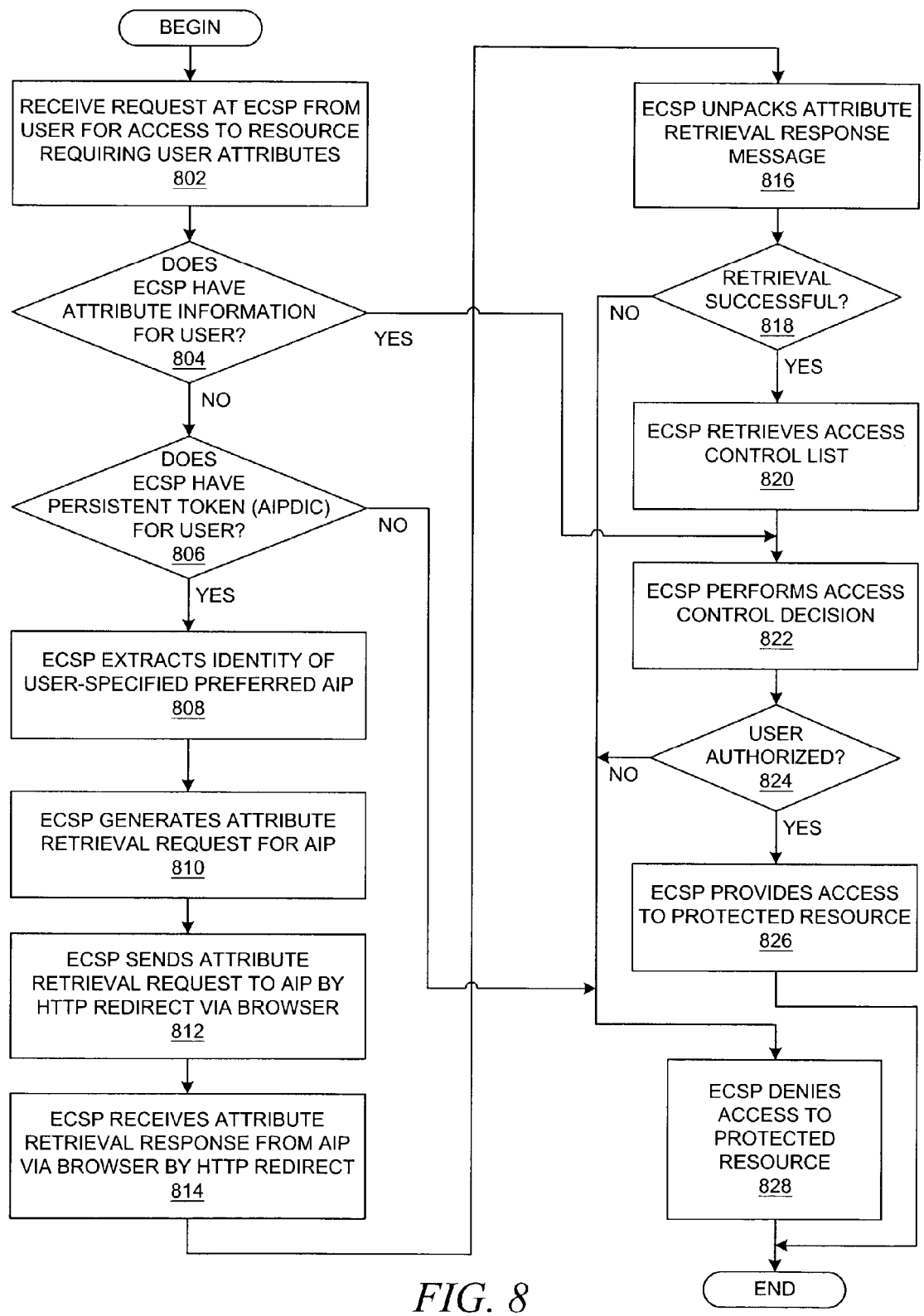
FIG. 8 is a flowchart that depicts a process by which an e-commerce service provider attempts to retrieve attribute information from an attribute information provider for a user who is attempting to access a resource at the e-commerce service provider.

With reference now to FIG. 8, a flowchart depicts a process by which an e-commerce service provider attempts to retrieve attribute information from an attribute information provider for a user who is attempting to access a resource at the e-commerce service provider. FIG. 8 shows a process that is initiated when a user requests access to a resource. In response, an e-commerce service provider decides that user attribute information is required, possibly for an access control decision, for a content personalization operation, or for some other user-specific operation. It may be assumed that the e-commerce service provider authenticates the user or obtains the identity of the user in some trustworthy manner when necessary, e.g., an authentication assertion or through a process such as that shown in FIG. 1D.

In order for the user-specific operation to be performed, the e-commerce service provider requires attribute information for the user. In the present invention, the e-commerce service provider is not required to prompt the user for attribute information, yet the e-commerce service provider may not have direct access to a user attribute information repository nor a dedicated or proprietary attribute information manager, such as those shown in FIG. 2, that may be storing and maintaining the attribute information. Moreover, the e-commerce service provider desires to minimize the number of information requests that are sent to the user.

Instead, in accordance with the use and advantages of the present invention, the e-commerce service provider attempts to retrieve user attribute information from an attribute information provider that acts in place of a domain's dedicated or proprietary attribute information manager. In accordance with the present invention, a user has an ability to direct the attribute information retrieval operation to one of potentially many attribute information providers.

The process in FIG. 8 begins with an e-commerce service provider receiving a request from a user for access to a resource for which the e-commerce service provider needs to perform a user-specific operation (step 802). As noted above, user-specific operations may include content personalization operations, access control decisions, i.e. authorization decisions, or other types of operations. The following examples depict access control decisions, but it should be understood that the present invention is applicable to a variety of user-specific operations that require user attribute information. For example, a Web page can be customized to include a weather report for the region that corresponds to the user's residence address that is stored as part of the user's attribute information. This step may be necessary only for those situations in which additional attributes are required for a user-specific response; there may be other cases in which the e-commerce service provider does not require such information, e.g., serving non-customized Web pages.

A determination is then made as to whether or not the e-commerce service provider already has attribute information for the user, possibly cached from a previous transaction (step 804). It should also be noted that the methods of the present invention could be implemented along with other methods for handling user attributes, and the operations for different attribute storage methods could be merged in some manner that requires multiple checks for user attribute storage from different locations or services, which could be accommodated at step 804. For example, the e-commerce service provider may maintain user attribute storage for certain customers who have permitted the e-commerce service provider to maintain personal information, possibly instead of and/or in addition to using an attribute information provider.

If the e-commerce service provider does not have attribute information for the user, then the e-commerce service provider determines whether or not it possesses or can retrieve an AIP domain identity token for the user (step 806). The AIP domain identity token for a particular user would contain information that identifies one or more attribute information providers that manage user attribute information for the particular user; the establishment of a persistent AIP domain identity token for a given user was explained above. Hence, the e-commerce service provider may possess an AIP domain identity token for the user because it may have been received in the form of an HTTP cookie from the user's browser as part of an associated HTTP request. Alternatively, the e-commerce service provider may retrieve the AIP domain identity token for the user from a datastore, such as a server-side user registry database, which implies that the e-commerce service provider has previously authenticated the user to determine the identity of the user.

If the e-commerce service provider determines that it has an AIP domain identity token for the user, then the e-commerce service provider extracts the identity of an attribute information provider from the AIP domain identity token (step 808) and generates an attribute retrieval request message for the indicated attribute information provider (step 810). The e-commerce service provider sends the attribute retrieval request message to the appropriate attribute information provider using HTTP redirection via the user's browser (step 812). An application that is providing the functionality for the e-commerce service provider could be implemented with an event queue such that messages can be sent and received asynchronously; after sending the attribute retrieval request message, the application would not have to wait for the return of a corresponding attribute retrieval response message because the application could perform other actions during this time period.

Given the scenario described with respect to steps 802-812, one can understand the effectiveness of operations within the federation. Although the e-commerce service provider does not already have attribute information for the user, most likely because the user is initiating a new session with the e-commerce service provider, the e-commerce service provider can attempt to obtain attribute information for the user from the user's indicated attribute information provider. Since an AIP-enrollment process already established the identity of an attribute information provider for the user in some manner with the e-commerce service provider through the use of a persistent AIP domain identity token, the user has not been asked to provide the identity of an attribute information provider directly to the e-commerce service provider during this particular session.

The examples of the present invention that are shown in the figures employ HTTP redirection via the user's browser to exchange information between entities, such as an attribute information provider and a requesting e-commerce service provider. However, it should be noted that the present invention may be conducted over a variety of communication protocols and is not meant to be limited to HTTP communications. Moreover, the entities may communicate directly when necessary; messages are not required to be redirected through the user's browser.

Continuing with the example, at some point in time, the e-commerce service provider receives the attribute retrieval response message from the attribute information provider using HTTP redirection via the user's browser (step 814). The e-commerce service provider unpacks the attribute retrieval response message (step 816) and examines it to determine whether the attribute retrieval operation was successfully completed (step 818). If so, then the e-commerce service provider retrieves an access control list (step 820) and initiates the access control decision operation (step 822). A determination is made as to whether or not the user is authorized (step 824), and if the result of the access control decision is positive, i.e. the user is authorized, then the e-commerce service provider provides access to the protected resource (step 826), and the process is complete. If the attribute retrieval operation was not successfully completed at step 818, then the e-commerce service provider denies access to the protected resource (step 828), and the process is complete.

It should be noted that, in some cases, an e-commerce service provider or other type of domain may have direct access to an attribute information manager that may provide the user's attribute information. For example, a domain may maintain user attribute information for many users in server-side storage. Referring again to step 804, if the e-commerce service provider already has attribute information for the user, then the process branches to step 822 in which the e-commerce service provider immediately performs an access control decision. This scenario may also occur, for example, when the user has already accessed the same or a similar controlled resource at the e-commerce service provider, after which the e-commerce service provider may have cached the user's attribute information.

It should also be noted that FIG. 8 depicts the use of a single attribute information provider. However, the framework of the federation may be implemented to support the use of multiple user-specified attribute information providers, as explained in more detail further below with respect to FIG. 9.

FIG. 8 illustrates how a user may attempt to access a resource at an e-commerce service provider and how the e-commerce service provider may need user attribute information to perform a user-specific operation. Referring again to step 806, the e-commerce service provider determines whether it has a persistent AIP domain identity token for the user. The AIP domain identity token contains identity information for an attribute information provider that can retrieve user attribute information in response to a request from the e-commerce service provider. The e-commerce service provider might possess an AIP domain identity token for the user, such as a persistent HTTP cookie, because one could have been previously established through an AIP-enrollment operation. However, if the e-commerce service provider does not have an AIP domain identity token for the user, then the e-commerce service provider may deny access to the requested resource at step 828.

It should be noted that it is possible for the e-commerce service provider to independently interact with the user while also implementing the present invention, such as authenticating the user and prompting the user to provide information about the identity of any attribute information providers at which the user stores his/her attribute information or prompting the user to provide the required attribute information directly to the e-commerce service provider at step 804. However, these actions would not have the advantages that are provided through the present invention. A goal of the present invention is to allow the user to act within a federated environment more efficiently by having to overcome fewer information barriers. Hence, it is preferable within the federated environment for an e-commerce service provider to be able to rely on the existence of an AIP domain identity token; information about the identity of any attribute information providers at which the user stores his/her attribute information can be obtained from the persistent AIP domain identity token, thereby reducing the burdens on the user to provide the information.

However, before an e-commerce service provider may rely on the existence of a persistent AIP domain identity token to provide the identity of an attribute information provider from which to retrieve a user's attribute information, the AIP domain identity token must be established in some manner. The present invention is directed to this feature of pre-establishing this information via AIP-enrollment operations. The present invention allows a user to enroll the identity of a user's attribute information provider at a given e-commerce service provider, which then stores the information in an AIP domain identity token that will be available to the e-commerce service provider.

Figure 9:
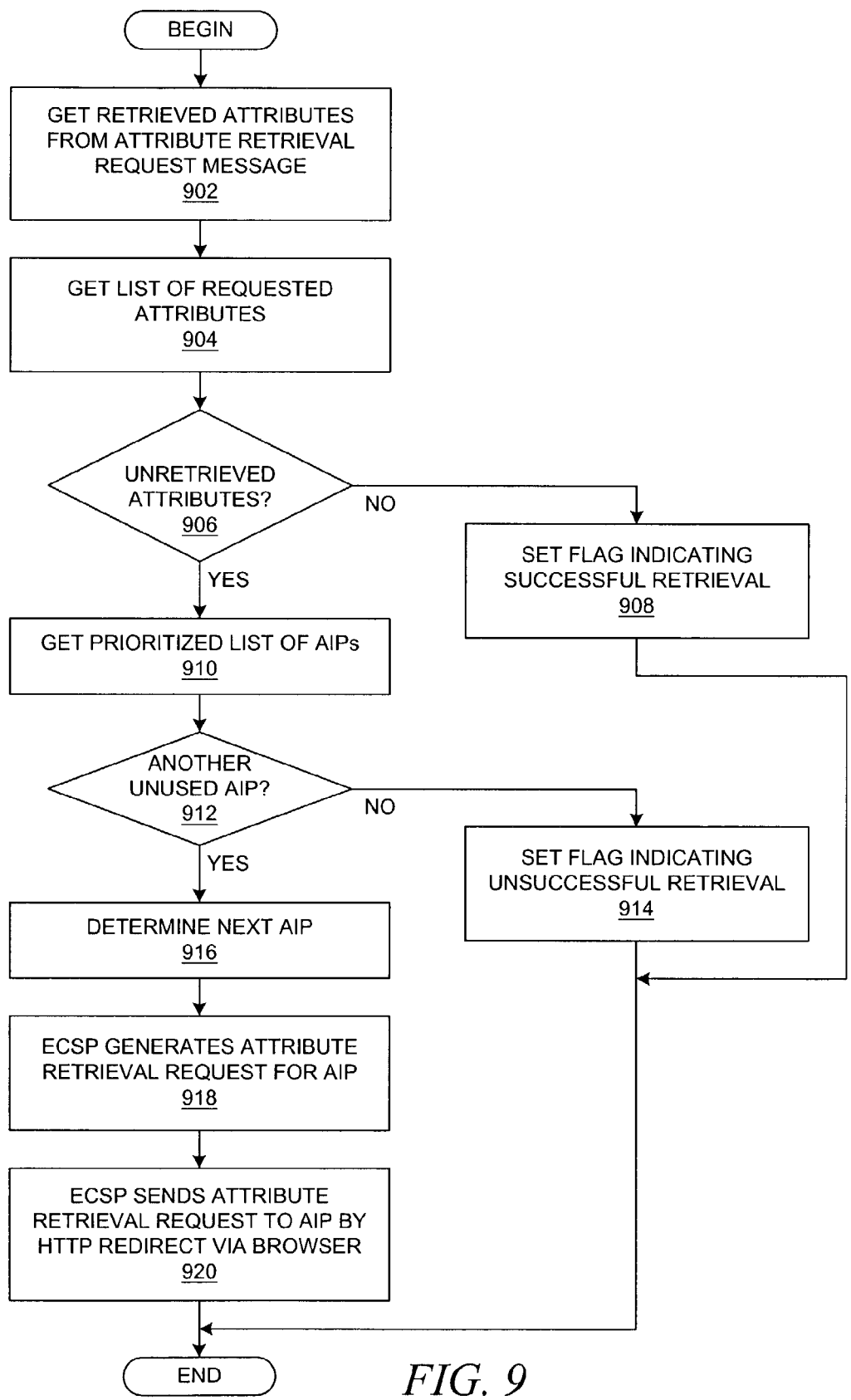
FIG. 9 is a flowchart that depicts a subprocess by which an e-commerce service provider attempts to retrieve attribute information from multiple prioritized attribute information providers for a user who is attempting to access a resource at the e-commerce service provider.

With reference now to FIG. 9, a flowchart depicts a subprocess by which an e-commerce service provider attempts to retrieve attribute information from multiple prioritized attribute information providers for a user who is attempting to access a resource at the e-commerce service provider. FIG. 9 depicts a subprocess that may be performed in conjunction with the process that is shown in FIG. 8. Step 818 in FIG. 8 examines the response message that has been returned by an attribute information provider in order to determine whether the attribute retrieval operation was successfully completed. In this manner, the process that is shown in FIG. 8 takes an all-or-none approach. This all-or-none approach in evaluating the retrieval operation may be useful in some environments. However, an attribute information provider may return various status codes that indicate a range of success in obtaining the requested attributes. Hence, the e-commerce service provider can review whether any attributes have been successfully retrieved and then determine its next action, as explained in more detail with respect to FIG. 9.

Referring to FIG. 9, after the e-commerce service provider has received and examined an attribute retrieval request message from an attribute information provider, e.g., as shown in steps 814 and 816 in FIG. 8, the e-commerce service provider gets a list of zero or more retrieved attributes from the attribute retrieval request message (step 902). After reading the list of attributes that were previously requested by the e-commerce service provider (step 904) (most likely, the attributes that are required by the e-commerce service provider to complete a requested transaction or user-specific operation), the list of requested attributes and the list of retrieved attributes are compared to determine if there were any attributes that were not successfully retrieved (step 906). Alternatively, the e-commerce service provider may be able to make this determination solely from the information that was returned by the attribute information provider within the attribute retrieval request message.

If there were no unretrieved attributes at step 906, i.e. all of the requested attributes were retrieved by the most recently contacted attribute information provider, then a processing flag is set to indicate that the attribute retrieval operation was successful (step 908), and the subprocess is complete. In this case, there is no need to contact another attribute information provider because the e-commerce service provider has all of the attributes that it requires for its user-specific operation.

If there are some attributes that have not been retrieved, the e-commerce service provider does not necessarily have to fail the attribute retrieval operation for the current transaction. The process that is shown in FIG. 8 was described above as if the e-commerce service provider could only contact one attribute information provider to retrieve the attributes for the user. However, there may be multiple attribute information providers that are associated with the user who initiated the original resource request. At steps 806 and 808 in FIG. 8, rather than the persistent AIP domain identity token only containing the identity of a single preferred attribute information provider, the AIP domain identity token may contain a prioritized list of multiple preferred attribute information providers. In other words, after the e-commerce service provider has attempted to retrieve attributes from a single attribute information provider, the e-commerce service provider may have additional attribute information providers from which it may attempt to retrieve the user's attribute information.

Hence, if there are some attributes that have not yet been retrieved, then the e-commerce service provider gets the prioritized list of attribute information providers for the user (step 910). A determination is made as to whether or not there are any other attribute information providers that have not yet been contacted to retrieve the user's attribute information (step 912). If not, then a processing flag is set to indicate that the attribute retrieval operation was unsuccessful (step 914), and the subprocess is complete. In this case, the e-commerce service provider cannot contact another attribute information provider because the e-commerce service provider has already contacted all of the attribute information providers that are associated with the user.

If there is at least one attribute information provider that has not yet been used in an attempt to retrieve the attributes, then the e-commerce service provider gets the name or identity of the next attribute information provider in the list (step 916). In a manner similar to that shown in steps 812 and 814 in FIG. 8, the e-commerce service provider generates an attribute retrieval request message that contains the names of the attributes that have not yet been retrieved (step 918) and sends the message to the appropriate attribute information provider by HTTP redirection via the user's browser (step 920), thereby completing the subprocess temporarily. Using a list of attribute information providers, the subprocess that is shown in FIG. 9 may be invoked multiple times; in this manner, the subprocess that is shown in FIG. 9 may be viewed as being an extension to the processing that is performed between steps 816 and 818 in FIG. 8.

With reference now to FIG. 10A, a graphical user interface window is shown in which selectable options are presented to a user by a home domain that allows a user to specify whether the user's AIP information should be reprioritized during an enrollment operation. As mentioned previously, a user may employ multiple attribute information providers for managing the user's attribute information; FIG. 6B depicts a manner in which the user selects or enters the identities of multiple attribute information providers, while FIG. 9 depicts a manner in which an e-commerce service provider may use multiple attribute information providers. During an AIP-enrollment operation at a particular e-commerce service provider, the e-commerce service provider may discover that the user already has an AIP domain identity token that has been previously generated and stored by the e-commerce service provider. In other words, the e-commerce service provider has already been provided with the identity of at least one attribute information provider that is managing user attribute information on behalf of the user; presumably, the e-commerce service provider has previously obtained this information directly from the user or through an earlier AIP-enrollment operation.

At that point, the e-commerce service provider needs to determine what action should be taken with respect to the previously received AIP information and the newly received AIP information, and FIG. 10A depicts some options that the user may be given with respect to the AIP information. It should be noted that the options that are shown are merely representative of the options that are supported by the present invention and that another embodiment may have more or less options.

Window 1000 contains a set of radio buttons that correspond to the options that the user is given. "Cancel" button 1002 allows a user to cancel the AIP-enrollment process, and "OK" button 1004 submits the user's choices to continue the AIP-enrollment process. Assuming that the user decides to continue the AIP-enrollment process, after the user chooses one of the radio buttons, the state of the radio buttons is determined.

Radio button 1006 corresponds to an option in which an e-commerce service provider should re-write or overwrite the previously received AIP information with the newly received AIP information. Radio button 1008 corresponds to an option in which an e-commerce service provider should append the newly received AIP information to the previously received AIP information. The e-commerce service provider may optionally scan the AIP information after it has been appended to remove any duplicate AIP identities or AIP domain names. Radio button 1010 corresponds to an option in which an e-commerce service provider should add the newly received AIP information to the previously received AIP information and then allow the user to reprioritize the AIP identities or AIP domain names. It should be noted that any option to add may include other forms of combination or alteration.

Window 1000 may be presented to a user by a home domain, and it should be noted that the home domain may be an attribute home domain or some other type of home domain. For example, referring again to FIG. 6A and FIG. 6B, a home domain may present window 600 to a user, and after a user has chosen the e-commerce service providers at which the user wishes to enroll, the home domain may present window 1000 to the user, or window 1000 may be presented in response to selection of option button 620. After the user has chosen the options in window 1000, the home domain may generate the appropriate AIP-enrollment processing flags that correspond to the user's choices in window 1000, and these flags are written into the AIP-enrollment request message/messages that is/are sent to the e-commerce service provider/providers at which the user is being AIP-enrolled. Hence, the home domain may be an attribute home domain or some other type of home domain, and the enrollment options are handled in a similar manner.

Figure 10B:
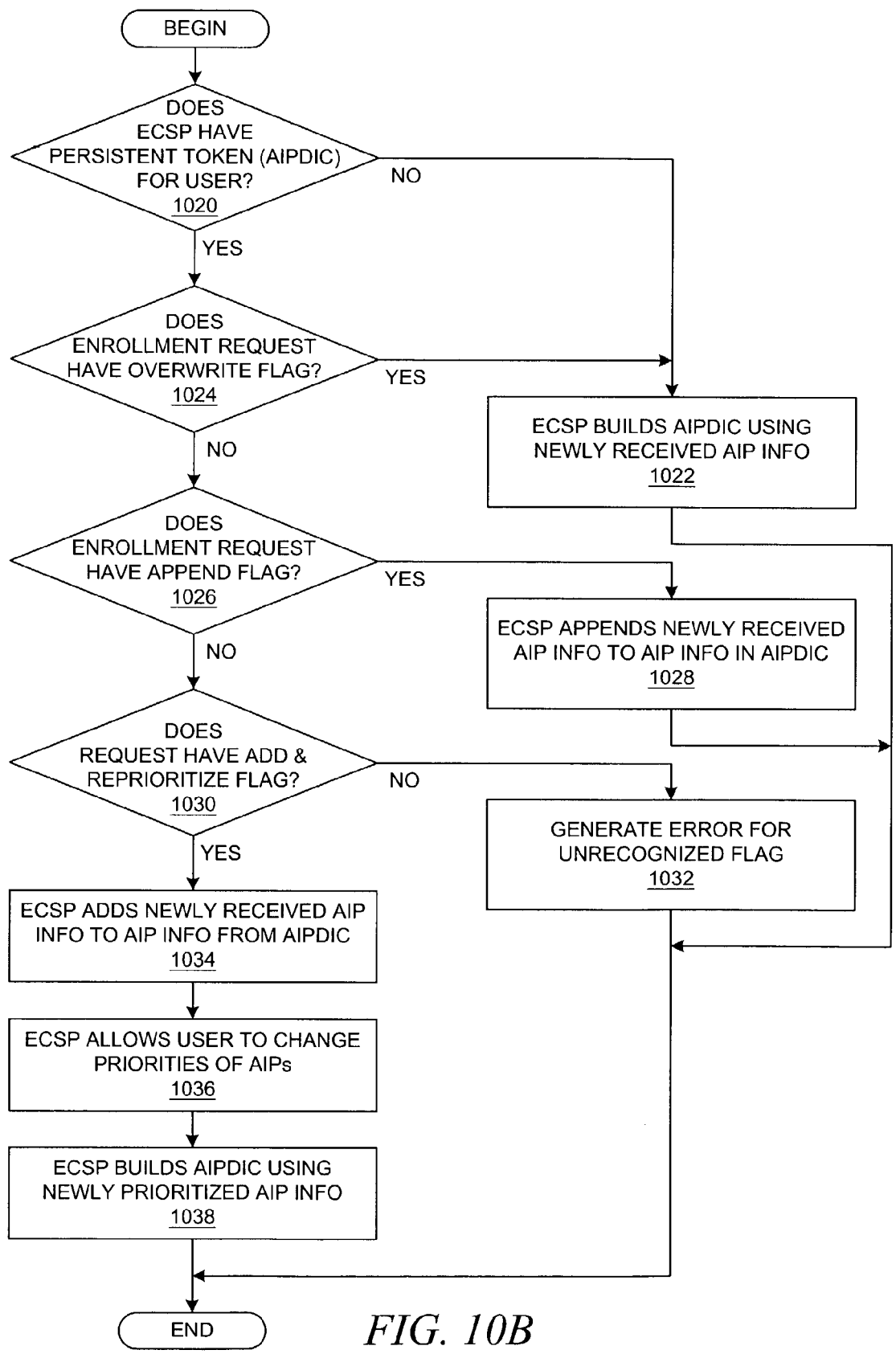
FIG. 10B is a flowchart that depicts a process in which an e-commerce service provider generates a persistent AIP domain identity token during an AIP-enrollment operation in accordance with processing options that have been received along with an AIP-enrollment request message.

With reference now to FIG. 10B, a flowchart depicts a process in which an e-commerce service provider generates a persistent AIP domain identity token during an AIP-enrollment operation in accordance with processing options that have been received along with an AIP-enrollment request message. The process that is shown in FIG. 10B provides further detail for the processing step of 774 in FIG. 7E in which an e-commerce service provider builds an AIP domain identity token.

The process begins after the e-commerce service provider has already received an AIP-enrollment request message. The e-commerce service provider determines if it has a AIP domain identity token for the user (step 1020). The AIP domain identity token may have been received by the e-commerce service provider as an HTTP cookie via an HTTP redirection through the user's browser, and the AIP domain identity token may have received or retrieved by the e-commerce service provider in some other manner. If there is no pre-existing AIP domain identity token, then a new AIP domain identity token is generated with the newly received AIP information that was contained in the AIP-enrollment request message (step 1022), and the process is complete.

If there is a pre-existing AIP domain identity token, then a determination is made as to whether the AIP-enrollment request message contained a re-write or overwrite flag (step 1024); if so, then a new AIP domain identity token is generated with the newly received AIP information that was contained in the AIP-enrollment request message, which is the same as step 1022, and the process is complete.

If the AIP-enrollment request message did not contain a re-write or overwrite flag, then a determination is made as to whether the AIP-enrollment request message contained a simple append flag (step 1026); if so, then the newly received AIP information that was contained in the AIP-enrollment request message is appended to the AIP information that is contained in the pre-existing AIP domain identity token (step 1028), and the process is complete.

If the AIP-enrollment request message did not contain a simple append flag, then a determination is made as to whether the AIP-enrollment request message contained an add-and-reprioritize flag (step 1030). If not, then the processing flag is not recognized, and an error may be generated (step 1032) and returned to the home domain that requested the AIP-enrollment operation. If there is an add flag, then the newly received AIP information that is contained in the AIP-enrollment request message is added to the AIP information that is contained in the pre-existing AIP domain identity token (step 1034). The combined AIP information is then presented to the user in a manner that allows the user to change the priorities of the attribute information providers (step 1036), after which a new AIP domain identity token is generated with the newly prioritized AIP information (step 1038), and the process is complete.

With reference now to FIG. 10C, a graphical user interface window is shown in which an e-commerce service provider allows a user to reprioritize the user's AIP information during an AIP-enrollment operation. Window 1040 displays the newly received AIP information that was contained in the AIP-enrollment request message and then was appended to the AIP information that was contained in the pre-existing AIP domain identity token; e.g., window 1040 could be presented during step 1036 that is shown in FIG. 10B. "OK" button 1041 closes window 1040 whether or not the user has changed any of the priorities of the AIP information. Identities 1042-1045 of the user's attribute information providers are displayed within window 1040, and their associated priorities 1046-1049 are displayed in text entry fields such that the user can enter new priority values; other value entry mechanisms may be employed, such as drop-down menus.

With an ability to append, add, and/or reprioritize the AIP information, a user could register with a first attribute information provider and enroll this AIP information with an e-commerce service provider. At some later time, a user could register with additional attribute information providers and enroll that AIP information with the e-commerce service provider. At each successive stage, the e-commerce service provider extends the AIP domain identity token with new information, and the user has the ability to indicate preferences for the attribute information providers, thereby controlling the order in which an e-commerce service provider should attempt to contact the attribute information providers to gather the user's attribute information.

FIGS. 10A-10C depict merely one embodiment for handling scenarios in which the user has more than one attribute information provider. If the user has requested to complete an AIP-enrollment process at multiple e-commerce service providers, and the user has chosen an option to reprioritize the attribute information providers if an e-commerce service provider already has an AIP domain identity token for the user, then the user may be confronted with multiple reprioritizing requests, i.e. one at each e-commerce service provider that is completing the AIP-enrollment process.

In an alternative embodiment, the user may be given the ability to select optional processing flags for each of the domains at which the user wishes to complete an AIP-enrollment operation. This information would be passed to each domain in the AIP-enrollment request message as part of the option flags in the request message. For example, for each e-commerce service provider that is selected or entered in window 600 that is shown in FIG. 6A or FIG. 6B, the user may choose whether to overwrite, append, or add and reprioritize the AIP information that the e-commerce service provider is already maintaining. In this manner, the user could indicate that it wants to overwrite the AIP information at most e-commerce service providers, thereby restricting the number of times that the user must reprioritize the AIP information. As described hereinbelow, other alternative embodiments could also be supported by the home domain that is initiating the AIP-enrollment operation.

The reprioritization operations that are described with respect to FIGS. 10A-10C may be generalized such that the reprioritization operations are applicable to other types of service providers other than attribute information providers. For example, during an enrollment operation at a particular e-commerce service provider, the e-commerce service provider may discover that the user already has a domain identity token that has been previously generated and stored by the e-commerce service provider. In other words, the e-commerce service provider has already been provided with the identity of at least one service provider that is able to perform certain services on behalf of the user; presumably, the e-commerce service provider has previously obtained this information directly from the user or through an earlier enrollment operation.

At that point, the e-commerce service provider needs to determine what action should be taken with respect to the previously received service provider information and the newly received service provider information. In that scenario, options that are similar to those shown in FIG. 10A may be presented to the user, and the reprioritization options may be further processed in a manner similar to that described with respect to FIG. 10B and FIG. 10C. With an ability to add and reprioritize the generalized service provider information, a user could register with a first service provider and enroll this information with second service provider. At some later time, a user could register with additional service providers and enroll that information with the second service provider. At each successive stage, the second service provider extends the domain identity token with new information, and the user has the ability to indicate preferences for the service providers, thereby controlling the order in which the second service provider should attempt to contact the other service providers when it is necessary to obtain a particular type of service from one of the other service providers. If the user has requested to complete an enrollment process at multiple e-commerce service providers, and the user has chosen an option to reprioritize the service providers if an e-commerce service provider already has a domain identity token for the user, then the user may be confronted with multiple reprioritizing requests, i.e. one at each e-commerce service provider that is completing the enrollment process.

With reference now to FIG. 11A, a graphical user interface window is shown in which selectable options are presented to a user by a home domain that allows a user to specify a different home domain from which to initiate the AIP-enrollment operation. As explained above with respect to FIG. 6A, an AIP-enrollment operation could be initiated by a home domain for a given user session. In the example shown in FIG. 6A, the initiating domain is an attribute information provider, whereas in the example shown in FIG. 6B, the initiating domain is a user's authentication home domain. In the example of FIG. 6A and FIG. 6B, the user is allowed to select the one or more domains at which the user wishes to enroll the user's AIP information; these domains can be termed "enroll-at" domains. For descriptive purposes, the home domain that is initiating the AIP-enrollment operation can be termed an "enroll-from" domain.

While it may be more flexible for the federation to allow all home domains for a user to initiate an AIP-enrollment process, it may be more advantageous to have particular home domains control the AIP-enrollment process. For example, if a user has an active authentication home domain, then it may be preferable to have the authentication home domain control any enrollment processes for its registered users. The authentication home domain would then have the ability to record all of the enrollment processes and to perform related administrative tasks for those users.

In view of these concerns, as an alternative embodiment of the present invention, a home domain could send a request to a different home domain in order to ask the other home domain to control an AIP-enrollment operation, i.e. in order to ask the other home domain to act as an enroll-thru domain. Referring again to FIG. 6A and FIG. 6B, "Enroll-thru" button 622 could open a window, such as window 1100 that is shown in FIG. 11A, which allows the user to select options that are related to this particular embodiment. "Cancel" button 1102 allows a user to cancel the entry of any options, and "OK" button 1104 submits the user's choices to continue the AIP-enrollment process. Text entry field 1106 allows a user to enter an identity for an enroll-thru domain that will control the AIP-enrollment operation; an alternative entry mechanism, such as a drop-down menu, could also be employed.

After the user closes window 1100, the user may continue interacting with window 600 until the user has selected "OK" button 610. Rather than attempting to control the AIP-enrollment operation, as shown in FIGS. 7A-7C, the home domain would transfer control of the AIP-enrollment operation to the other home domain that was indicated by the user in window 1100, i.e. the enroll-thru domain. After the enroll-thru domain accepts the transfer of control for the AIP-enrollment operation, the enroll-thru domain performs the processes that are described with respect to FIGS. 7A-7C. The actions with respect to an AIP-enrollment operation via an enroll-thru domain are described hereinbelow.

Figures 11D, 11E:
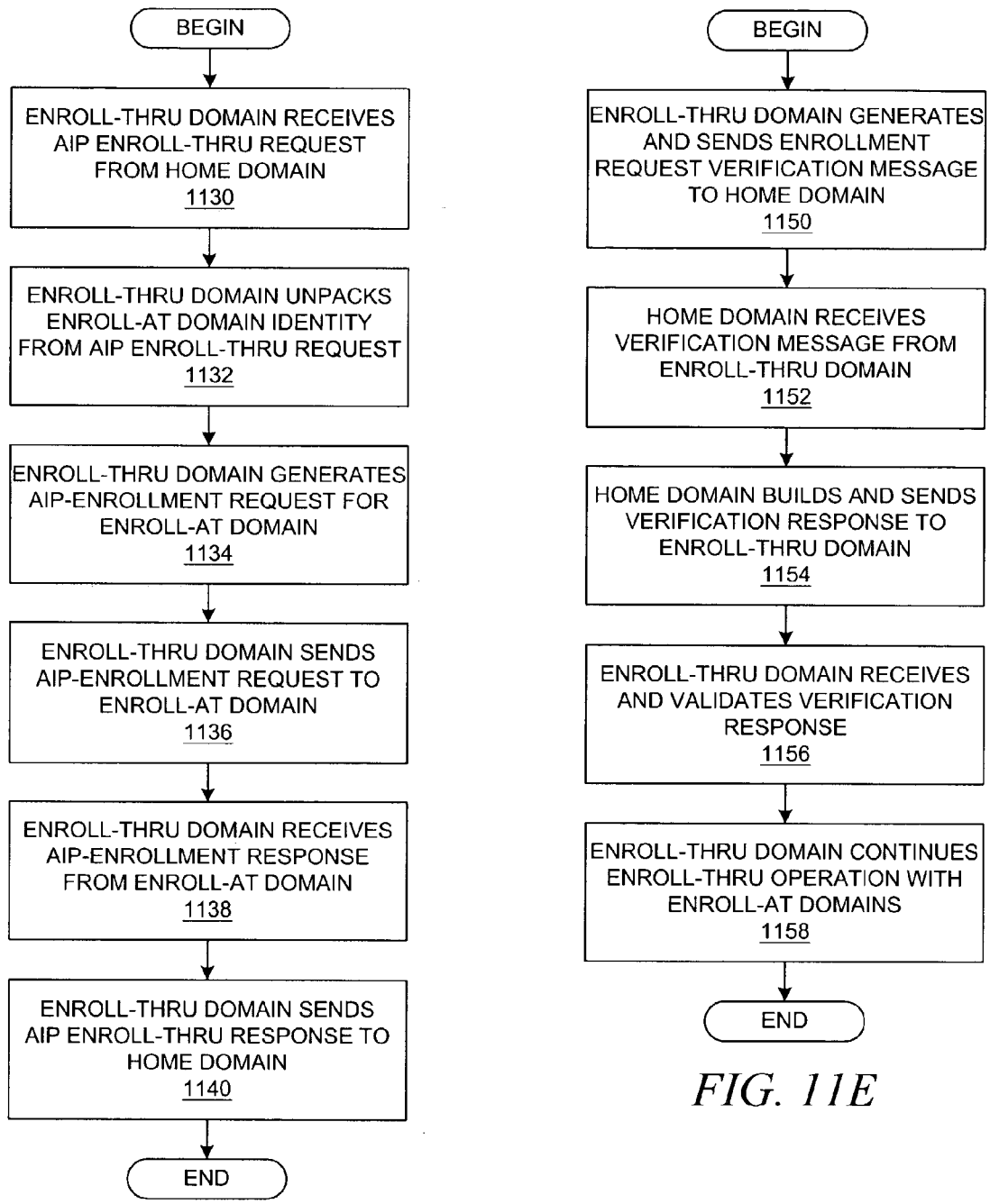
FIG. 11D is a flowchart that depicts a process at an enroll-thru domain that is responding to an AIP enroll-thru request from a requesting home domain.
FIG. 11E is a flowchart that depicts an optional integrity checking subprocess that may be combined with the process that is shown in FIG. 11D.

With reference now to FIG. 11B, a block diagram depicts some of the data flow or interaction among a user, a home domain, an enroll-thru domain, and at least one enroll-at domain during the completion of an AIP-enrollment operation. User 1110 selects a resource at home domain 1112 that initiates an AIP-enrollment operation. In addition, user 1110 indicates that the AIP-enrollment operation is to be completed indirectly through an enroll-thru domain 1114 rather than directly from the home domain. When requested to do so, enroll-thru domain 1114 controls the remainder of the AIP-enrollment operation at enroll-at domains 1116, e.g., e-commerce service providers, as described with respect to FIG. 11C and FIG. 11D hereinbelow. This contrasts with the alternative methods that were described above with respect to FIGS. 7A-7C in which home domain 1112 completes the AIP-enrollment operation directly with enroll-at domains 1116 if desired by user 1110.

With reference to FIG. 1C, a flowchart depicts a process by which a home domain requests an AIP-enrollment operation at an enroll-thru domain. The process begins with the home domain receiving an enroll-thru request from a user (step 1120). The user may make an enroll-thru request by selecting an enroll-thru button, as described above with respect to FIG. 11A, or the user could access some other resource; in either case, the user has specified an enroll-thru domain.

The home domain then generates an AIP enroll-thru request message (step 1122). This message may comprise the information that the user has entered into window 600, e.g., the identifiers for the enroll-at domains, along with identity information associated with the user. The home domain then sends the AIP enroll-thru request message to the enroll-thru domain via HTTP redirect through the user's browser (step 1124). At some later point in time, the home domain receives an AIP enroll-thru response message via HTTP redirect through the user's browser (step 1126), after which the home domain sends an AIP enrollment response to the user (step 1128), and the process is complete.

With reference now to FIG. 11D, a flowchart depicts a process at an enroll-thru domain that is responding to an AIP enroll-thru request from a requesting home domain. The process begins when the enroll-thru domain receives an AIP enroll-thru request message from the user's home domain via HTTP redirect through the user's browser (step 1130). The enroll-thru domain unpacks at least one enroll-at domain identity from the AIP enroll-thru request message (step 1132). The enroll-thru domain may also extract identity information that is associated with the user from the AIP enroll-thru request message if the user's identity is not available through some other means.

Steps 1134-1138 are completed in a manner similar to that described above with respect to steps 746-750 in FIG. 7C. The enroll-thru domain generates an AIP-enrollment request message for the enroll-at domain (step 1134) and then sends the AIP-enrollment request message to the enroll-at domain (step 1136). At some later point in time, the enroll-thru domain receives an AIP-enrollment response message from the enroll-at domain (step 1138). If the enroll-thru request message contains multiple enroll-at domains, then the enroll-thru domain repeats steps 1134-1138 for each enroll-at domain. After sending the AIP-enrollment requests to the enroll-at domains, the enroll-thru domain sends an AIP enroll-thru response message to the home domain (step 1140), and the process is complete. It should be understood that the enroll-thru request message and enroll-thru response message are similar in structure to the AIP-enrollment request message and the AIP-enrollment response message that are shown in FIG. 7D and FIG. 7G, respectively.

In the description of FIGS. 11A-11D above, the home domain accepts input from the user about the enroll-at domains for the AIP-enrollment operation, after which the home domain then forwards an enroll-thru request to the enroll-thru domain. In an alternative embodiment, the home domain may merely allow the user to start an enroll-thru operation from the home domain, after which the home domain sends an enroll-thru request to the enroll-thru domain. The enroll-thru domain would then be responsible for obtaining user input about the AIP-enrollment operation through a GUI window similar to window 600 in FIG. 6B. In that case, most of the user interaction for the AIP-enrollment operation would be performed by the enroll-thru domain.

With reference now to FIG. 1E, a flowchart depicts an optional integrity checking subprocess that may be combined with the process that is shown in FIG. 11D. The enroll-thru domain and the home domain that are described with respect to FIG. 11D may have a trust relationship within a federation; however, the enroll-thru domain may need to ensure that an AIP-enrollment operation is not maliciously initiated. Hence, the enroll-thru domain may require a strong validation of the enroll-thru request before continuing with the AIP-enrollment operation.

The process begins with the enroll-thru domain, in response to receiving an AIP enroll-thru request message, generating and sending an AIP-enrollment request verification message to the home domain that has initiated the AIP-enrollment operation (step 1150). The AIP-enrollment request verification message may be returned to the home domain via HTTP redirection through the user's browser, and the AIP-enrollment request verification message may be integrity and confidentiality protected in addition to being transmitted over HTTP or SSL. The AIP-enrollment request verification message may echo certain information items from the AIP enroll-thru request message into the AIP enrollment request verification message, such as the user's identity. In addition, the AIP-enrollment request verification message may include tokens, nonces, timestamps, or other information that uniquely identifies the AIP-enrollment request verification message.

After the home domain receives the AIP-enrollment request verification message from the enroll-thru domain (step 1152), the home domain builds and returns a verification response message to the enroll-thru domain (step 1154). The verification response message may be returned via HTTP redirection through the user's browser, and the verification response message may echo the unique identification information from the verification request message, thereby binding the verification response to the verification request to prevent spoofing.

After the enroll-thru domain has received and validated the verification response (step 1156), the enroll-thru domain can continue the enroll-thru operation with the enroll-at domains that were identified in the AIP enroll-thru request message (step 1158) as described above with respect to FIG. 1D, and the process is complete. If the verification cannot be validated, then the enroll-thru domain can return some type of enrollment failure message to the requesting home domain.

The enroll-thru operations that are described with respect to FIGS. 11A-11E may be generalized such that the enroll-thru operations are applicable to other types of service providers other than attribute information providers. In a manner similar to that mentioned above, although it may be more flexible for the federation to allow all home domains for a user to initiate various types of enrollment processes, it may be more advantageous to have particular home domains control the enrollment processes. For example, if a user has an active authentication home domain, then it may be preferable to have the authentication home domain control any enrollment processes for its registered users. The authentication home domain would then have the ability to record all of the enrollment processes and to perform related administrative tasks for those users. In view of these concerns, a home domain may send a request to a different home domain in order to ask the other home domain to control an enrollment operation, i.e. in order to ask the other home domain to act as an enroll-thru domain. Hence, a generalized application of an enroll-through operation allows a user to invoke an enrollment process at a domain other than the domain at which the user wishes to enroll.

The enrollment operations that are described hereinabove with respect to the previous figures preferably occur prior to a user initiating a transaction at an e-commerce service provider. For example, FIG. 7E depicts a process in which an e-commerce service provider generates and sets an AIP domain identity token at a user's client device. FIG. 8 depicts a process in which a preferred control flow requires that the e-commerce service provider receives an AIP domain identity token from the user's client when the user initiates a transaction with the e-commerce service provider, which assumes the pre-establishment of the AIP domain identity token through a process such as that described with respect to FIG. 7E. In some instances, a user may initiate a transaction at an e-commerce service provider without having previously established an AIP domain identity token. In these instances, FIG. 8 may deny access to a resource.

Rather than letting an attempted transaction fail, which may annoy customers of an e-commerce service provider, the present invention allows a user to be dynamically AIP-enrolled at the e-commerce service provider after a transaction has been initiated at the e-commerce service provider, i.e. in the middle of the transaction. Moreover, the present invention allows a user to complete a registration operation with an attribute information provider after a transaction has been initiated at the e-commerce service provider. These processes are described in more detail below.

Figure 12A:
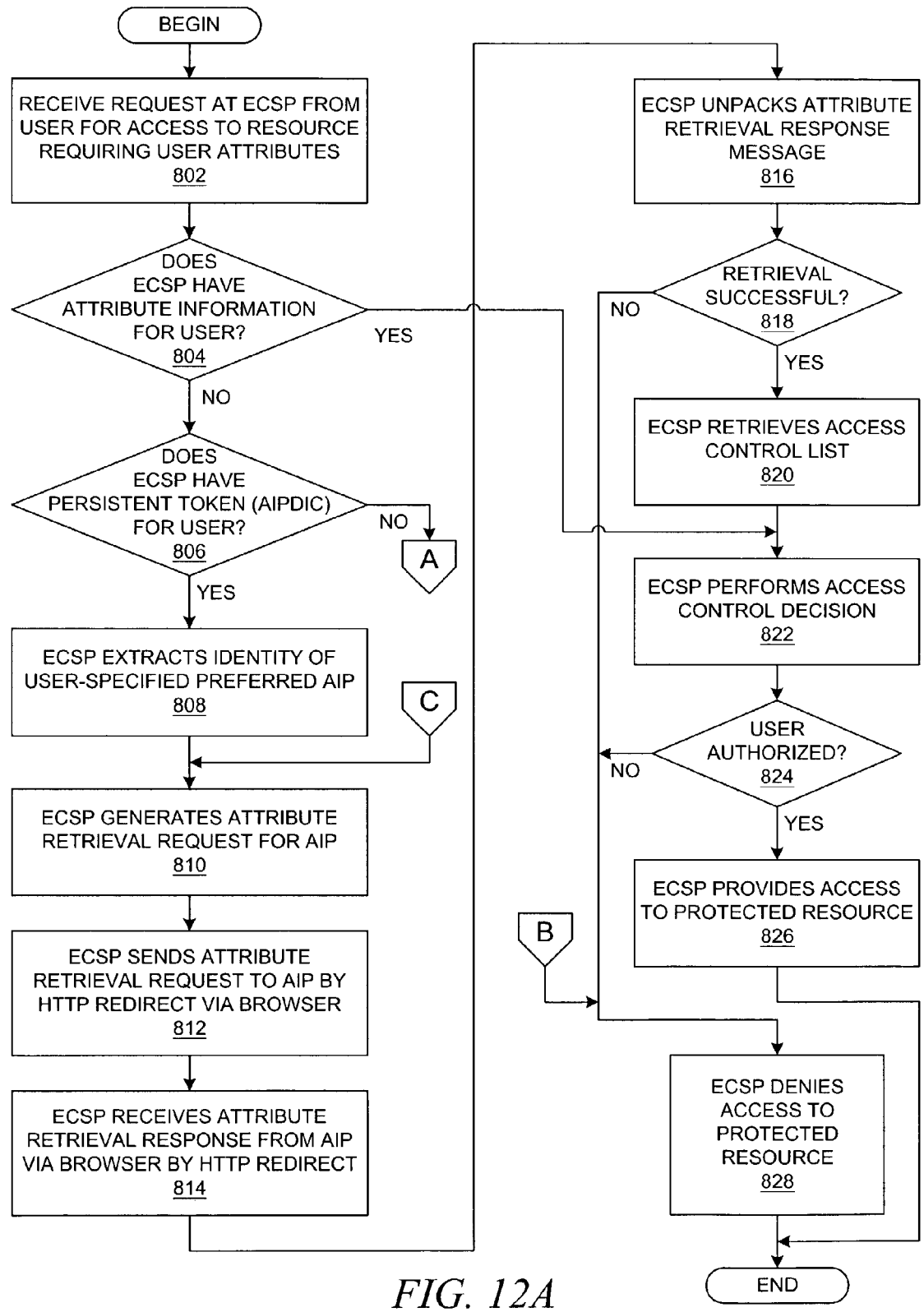
FIGS. 12A and 12B are a pair of flowcharts that depict a process by which an e-commerce service provider allows a user to enroll at an attribute information provider during a transaction at the e-commerce service provider.
Figure 12B:
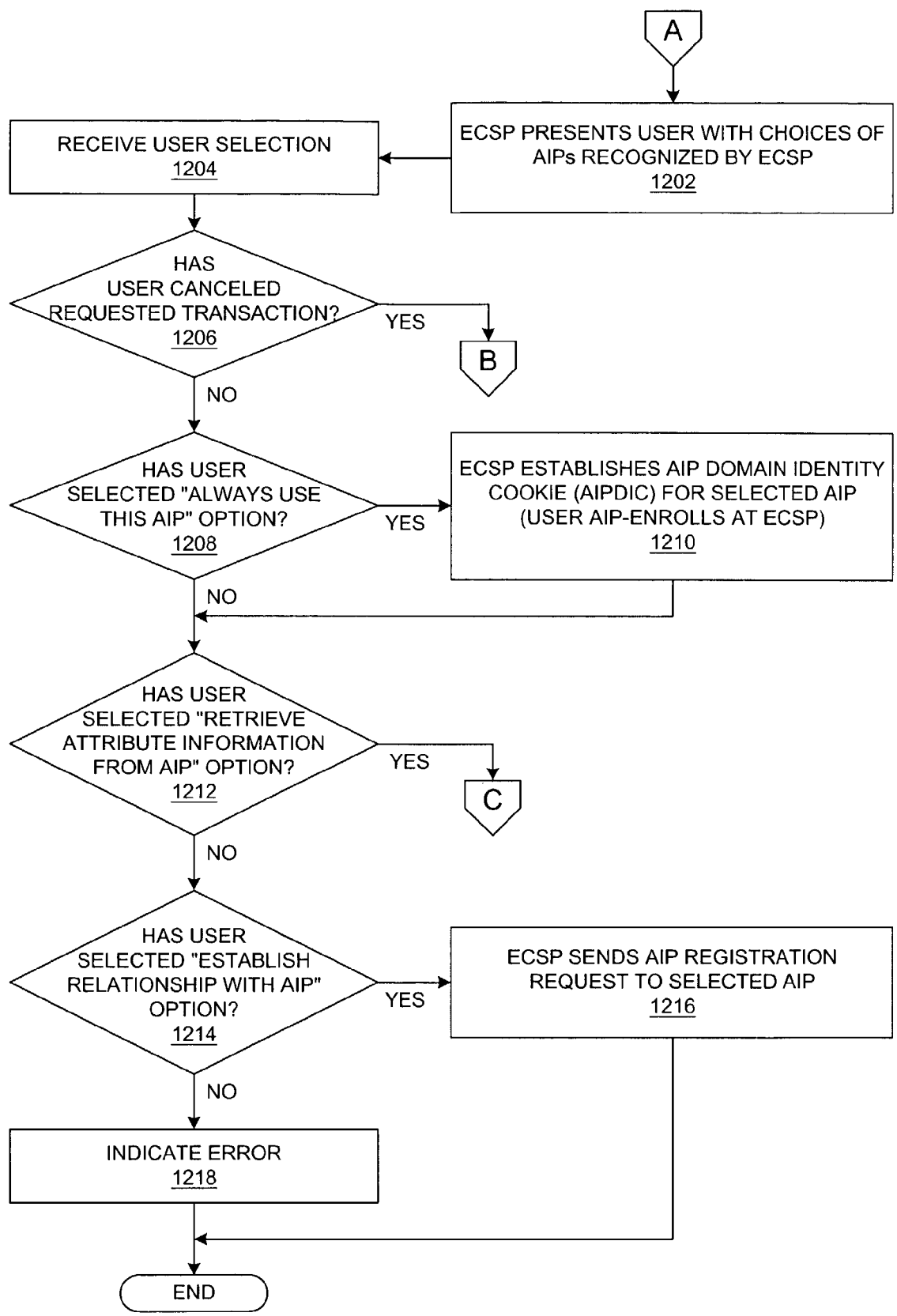

With reference now to FIGS. 12A and 12B, a pair of flowcharts depict a process by which an e-commerce service provider allows a user to enroll at an attribute information provider during a transaction at the e-commerce service provider. Steps 802-828 in FIG. 12A are similar to steps 802-828 in FIG. 8. However, the process that is shown in FIG. 12A reaches the subprocess that is shown in FIG. 12B through step 806 in FIG. 12A. In addition, step 806 in FIG. 8 has a different outcome than step 806 in FIG. 12A, which has multiple outcomes based on the control flow within a subprocess that is shown in FIG. 12B. In contrast with the scenario that is depicted in FIG. 8, if the e-commerce service provider does not have a persistent token for the user in FIG. 12A, rather than failing the transaction, the process branches to complete the subprocess that is shown in FIG. 12B.

Figure 13A:
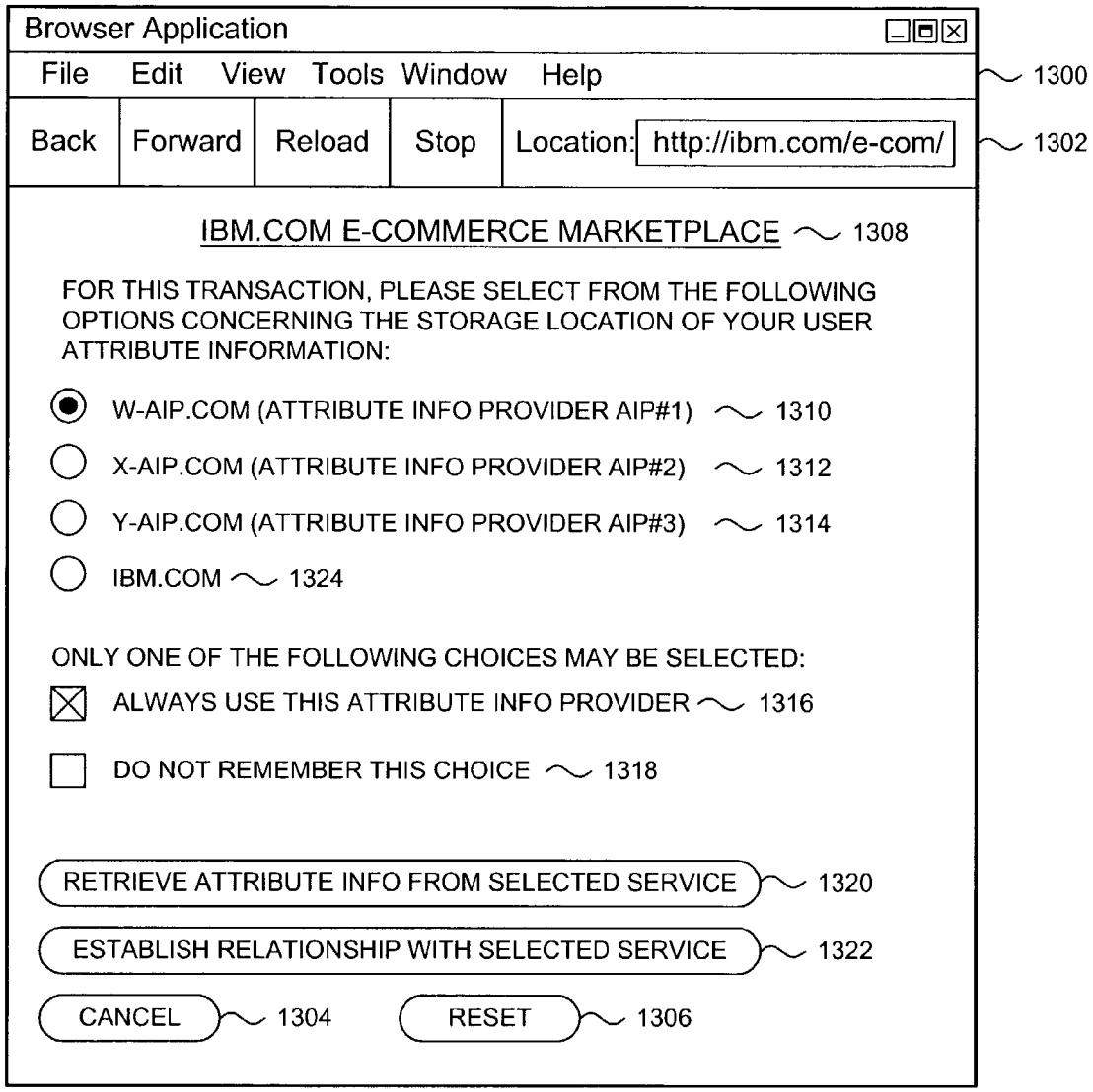
FIG. 13A is a graphical user interface window that shows the selectable options that are presented to a user by an e-commerce service provider that allows a user to select an attribute information provider that should be used by the e-commerce service provider in order to complete a transaction.
Figure 13B:
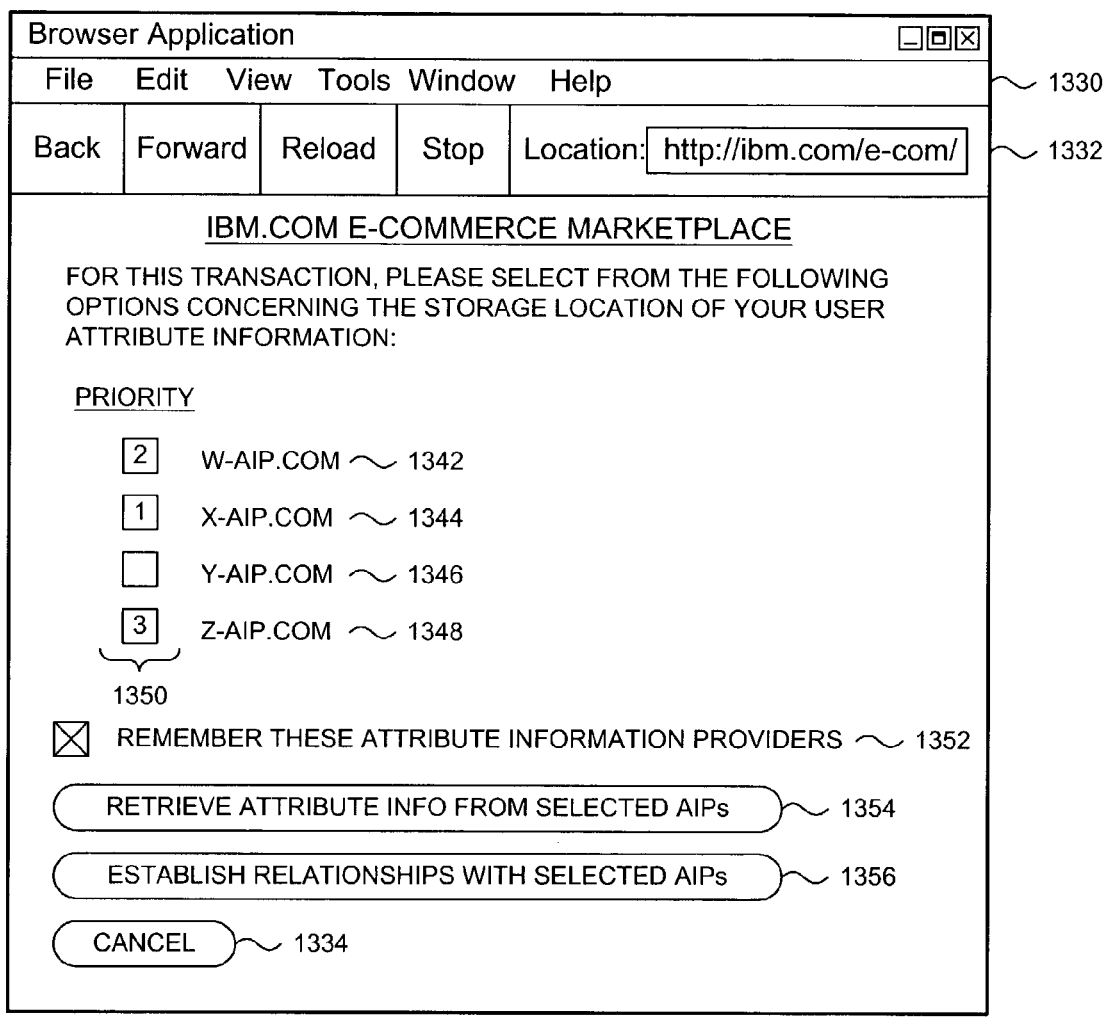
FIG. 13B is a graphical user interface window that shows the selectable options that are presented to a user by an e-commerce service provider that allows a user to select and prioritize multiple attribute information service providers that should be used by the e-commerce service provider in order to complete a transaction.

After determining that the e-commerce service provider does not have or cannot retrieve an AIP domain identity token for the user, the process shown in FIG. 12B begins with the e-commerce service provider presenting the user with a window containing attribute information providers that are recognized by, or known to, the e-commerce service provider (step 1202) along with other options. FIG. 13A and FIG. 13B depict examples of user input windows that may be used to present processing options as described with respect to the steps that are shown in FIG. 12B.

After presenting the window, the e-commerce service provider receives a user selection or user input (step 1204). A determination is made as to whether the user has requested to cancel the pending transaction at this point (step 1206), and if so, then the process branches back to step 828 in FIG. 12A, at which point the user's transaction would fail.

If the user has not requested to cancel the pending transaction at this point, then a determination is made as to whether the user has selected a particular option that indicates a desire to permanently use a particular attribute information provider (step 1208) for subsequent transactions. If so, then the e-commerce service provider establishes a persistent AIP domain identity token that indicates the user's selected, i.e. preferred, attribute information provider (step 1210); the selected attribute information provider is indicated through other user input that is received from the dialog window. In a preferred embodiment, the persistent token may be established by setting an HTTP AIPDIC cookie at the user's browser.

If the user has chosen the option described at step 1208, then the user has essentially requested an AIP-enrollment operation. The selected attribute information provider's identifier is the user's AIP information in a manner similar to the user's AIP information in the AIP-enrollment operations that were described above. Similarly, both the home domain and the enroll-at domain for this AIP-enrollment operation is the e-commerce service provider at which the user is completing the transaction. In other words, the user is completing an AIP-enrollment operation in which the enroll-at domain is the e-commerce service provider with which the user is currently interacting.

In either outcome at step 1208, a determination is then made as to whether the user has selected an option to retrieve attribute information from an attribute information service provider (step 1212); the selected attribute information provider is indicated through other user input that is received from the user dialog box. In other words, the user has selected a preferred attribute information provider that the e-commerce service provider should use to retrieve attributes for the user, and the process branches back to step 810, at which point the e-commerce service provider generates and sends an attribute retrieval request message to the chosen attribute information provider.

If the user has not chosen the option to retrieve attribute information from an attribute information provider, then a determination is made as to whether the user has selected an option to establish a relationship with an attribute information provider (step 1214). The user may select this option if the user has not previously established a relationship with any attribute information providers. If the user has chosen the option described at step 1214, then the user has essentially requested to register at an attribute information provider.

If so, then the e-commerce service provider sends an AIP registration request of some form to the selected attribute information provider (step 1216), e.g., by redirecting the user's browser to a particular page supported by the user's selected attribute information provider. At that point, the user may be directed by the attribute information provider to provide certain information or to perform certain actions to establish a user account or user profile at the attribute information provider.

If none of the above options have occurred, then a processing error is indicated by the e-commerce service provider in some manner (step 1218), and the process is complete.

With reference now to FIG. 13A, a graphical user interface window shows the selectable options that are presented to a user by an e-commerce service provider that allows a user to select an attribute information provider that should be used by the e-commerce service provider in order to complete a transaction. Window 1300 is a typical browser application window that a user would have previously used to request a resource from the e-commerce service provider, i.e. to initiate some type of transaction with the e-commerce service provider. In most Web environments, the controls that are shown in window 1300 would likely be presented in the form of an HTML-formatted document, i.e. Web page, that can be presented by a browser application that is executing on a client device that is being operated by the user. Toolbar 1302 contains typical controls for use within the browser application window. Cancel button 1304 provides a user with an opportunity to cancel the pending request to access a controlled resource at the e-commerce service provider, in particular, prior to being prompted for a preferred attribute information provider or prior to any other actions. Reset button 1306 allows a user to quickly return to default values or to clear all of the input fields. The name of the e-commerce service provider is shown at the top 1308 of the content area of window 1300.

Window 1300 may be presented to a user when an e-commerce service provider gives a user an opportunity to dynamically select a preferred attribute information provider, as described above with respect to FIG. 12B. Each of the radio buttons 1310-1314 is associated with an attribute information provider with which the e-commerce service provider has a trusted relationship. As is well-known, a set of radio buttons allows a user to select only one of the options that are presented within the set of radio buttons.

In this scenario, the e-commerce service provider allows a user to choose one preferred attribute information provider, although the attribute information provider must have a trust relationship with the e-commerce service provider. If not, then the user is provided with an opportunity to establish a relationship with an attribute information provider that the e-commerce service provider recognizes, i.e. with which the e-commerce service provider has a trust relationship, as described below.

With respect to the ability of a user to specify an attribute information provider for a desired operation, the scenario in FIG. 13A is more restrictive than the scenarios that were described above in FIG. 6A and FIG. 6B. In FIG. 13A, the user does not have the opportunity to input the name of a different attribute information provider because the e-commerce service provider must have already established a trust relationship between itself and any attribute information providers that might be used during the user's transaction. An important reason for this restriction is that the e-commerce service provider can be assured that any subsequent operations with the attribute information provider will be secure. Another reason may be that this type of restriction reflects various agreements between members of a federation such that service providers within a federation support each other before interacting with non-federated domains.

Depending upon the implementation of the present invention, different sets of attribute information providers may be presented to the user as determined by administrative guidelines, profiles, databases, policies, or other sources, or the user may be provided with the opportunity to select or enter one or more attribute information providers. In addition, the user could be provided with an enroll-thru option such that the user is allowed to perform an enroll-thru operation at a trusted domain, preferably the user's authentication home domain.

Check box 1316 allows a user to request that the identity of the chosen attribute information provider should always be used by the e-commerce service provider when the e-commerce service provider needs to contact an attribute information provider for attribute information for the user. In response to a user selection of this option, the e-commerce service provider would set a persistent token, such as an AIPDIC, for the user. This persistent token would then be used by the e-commerce service provider for subsequent transactions, as explained above. Alternatively, the identity of the chosen attribute information service provider could be stored in a persistent client-side or server-side information repository.

Check box 1318 provides a user with the ability to request that the identity of the chosen attribute information provider should not be remembered in any manner. Although the user may choose not to select either check box 1316 nor check box 1318, the user may not select both check box 1316 and check box 1318, and the user interface would enforce selection of only one of the two check boxes.

Button 1320 closes the dialog box, after which the e-commerce service provider determines that the user has requested that the attribute information provider that has been selected within the radio buttons should be used for attribute retrieval requests by the e-commerce service provider. In other words, the selection of button 1320 in conjunction with the selection of a particular radio button informs the e-commerce service provider that the user already has a preferred attribute information provider and that, presumably, the user has already registered with the selected attribute information provider.

Button 1322 closes the dialog box and informs the e-commerce service provider that the user would like to establish a relationship with the attribute information provider that is indicated by the radio buttons. In other words, the selection of button 1322 in conjunction with the selection of a particular radio button informs the e-commerce service provider that the user does not already have a preferred attribute information provider and that the user would like to register with the selected attribute information provider.

Optionally, the e-commerce service provider may include functionality to act as an attribute information provider for its users, whether or not those users have registered with the e-commerce service provider for this additional service. In this case, the e-commerce service provider could present itself as one of the attribute information provider options in window 1300, e.g., radio button 1324; if the user has not previously registered for this additional service, the user could select button 1322 to register for this additional service.

With reference now to FIG. 13B, a graphical user interface window shows the selectable options that are presented to a user by an e-commerce service provider that allows a user to select and prioritize multiple attribute information service providers that should be used by the e-commerce service provider in order to complete a transaction. In a manner similar to window 1300 that is shown in FIG. 13A, window 1330 is a typical browser application window that a user would have used to request a resource from the e-commerce service provider. Toolbar 1332 contains typical controls for use within the browser application window. CANCEL button 1334 allows a user to cancel the pending transaction.

Window 1330 may be presented to a user when an e-commerce service provider gives a user an opportunity to select a prioritized list of preferred attribute information providers, which may be used in the process that is described above with respect to FIG. 9. Each attribute information provider 1342-1348 has a trusted relationship with the e-commerce service provider. Again, as mentioned above, the user does not have the opportunity to input the name of a different attribute information provider because the e-commerce service provider must have already established a trust relationship between itself and any attribute information providers that might be used with during the user's transaction. The user prioritizes the list of attribute information providers by entering a preferred ordinal number into one of text entry fields 1350. If the user does not want a particular attribute information provider to be included in the list that is associated with the user, the text entry field for an unwanted attribute information provider may remain blank, as shown by attribute information provider 1346. Presumably, the e-commerce service provider would ensure that the user must select at least one attribute information provider to be included in the list that is associated with the user.

In a manner similar to that described above for FIG. 13A, check box 1352 provides a user with the ability to request that the prioritized list of attribute information providers should always be used by the e-commerce service provider when the e-commerce service provider needs to contact one or more attribute information providers for attribute information for the user. In response to a user selection of this option, the e-commerce service provider would set a persistent AIP domain identity token for the user that indicates the prioritized list of attribute information providers. This persistent token would then be used by the e-commerce service provider for subsequent transactions, as explained above with respect to FIG. 8.

Button 1354 closes the dialog box and informs the e-commerce service provider that the user has requested that the list of attribute information providers should be used for attribute retrieval requests. Button 1356 closes the dialog box and informs the e-commerce service provider that the user would like to establish relationships, i.e. register, with the attribute information providers.

Referring again to FIG. 5, the present invention can be described in an exemplary implementation using the example of the federated environment that is shown in FIG. 5 and the options that were described with respect to FIG. 12B. The attribute retrieval process begins when a user requests a resource from a domain at which the user has not previously stored user attribute information, such as the domains supported by ECSP 510 or ECSP 520.

Assume that the user 502 attempts to access a resource from ECSP 510 and that the user has never accessed resources at ECSP 510. Hence, there would be no AIP domain identity cookie (or other persistent token or other AIP indicator) previously stored by ECSP 510, and ECSP 510 would not receive an AIP domain identity cookie along with the resource request from user 502. In that case, ECSP 510 will prompt the user for the identity of a preferred attribute information provider. As discussed above and shown in FIG. 13A, the user could be provided with options such as "retrieve attribute info from selected AIP", "establish relationship with selected AIP", or "always use a selected attribute information provider". Once the user has chosen these options, ECSP 510 will build an appropriate attribute retrieval request message to be sent to the user-selected attribute information provider.

If the user had selected an "always use this AIP" option, then ECSP 510 will build an AIP domain identity cookie for the user. This cookie will identify the user's preferred attribute information provider. Further accesses to resources at ECSP 510 will automatically generate an attribute retrieval request message to AIP 514 via HTTP redirection through the user's browser in accordance with the AIP domain identity cookie that was previously set.

Assume that the user has chosen an option to retrieve attributes from AIP 590. ECSP 510 will build an attribute retrieval request message for AIP 590 and send this request to AIP 590 by redirection through the browser of user 502. The attribute retrieval request message will be received by AIP 590. If AIP 590 has the appropriate attributes for the user, and if those attributes are releasable, then AIP 590 will build an attribute retrieval response message and redirect it back to ECSP 510 using HTTP redirection via the user's browser.

Based on the success of obtaining the requested information, AIP 590 will build an attribute retrieval response message for ECSP 510, and the attribute retrieval response message may indicate either a successful retrieval or a failed retrieval. This retrieval response will be returned to ECSP 510 using HTTP redirection via the user's browser.

ECSP 510, upon receiving the attribute retrieval response message with a successful retrieval indication from AIP 590, will perform a user-specific operation on the user's request, such as an access control decision.

If the attribute retrieval response message indicates that all of the requested attributes were not retrieved, then ECSP 510 may contact other attribute information service providers in the prioritized list that is associated with the user. In the example shown in FIG. 5, ECSP 510 may have trust relationships with multiple attribute information providers, so ECSP 510 could contact AIP 580 after contacting AIP 590 if the user had chosen to do so.

In this manner, information is passed from a home domain to other domains in the federated environment, i.e. e-community, through attribute retrieval request messages and attribute retrieval response messages. The values of the attributes that are retrieved from an attribute information provider are preferably not cached for long periods of time, possibly never cached. In addition, the attribute information is preferably protected by encryption.

The advantages of the present invention should be apparent in view of the detailed description of the invention that is provided above. The present invention allows a user to contract with one or more attribute information providers (AIPs) within a federated environment. The user maintains a trust relationship with these AIPs and provides user attribute information that is stored and maintained by the AIPs. E-commerce service providers, such as online banks or online merchants, also maintain relationships with attribute information providers such that the e-commerce service provider can trust the user attribute information that is provided by an attribute information provider on behalf of the user in response to a request from the e-commerce service provider. As mentioned above, it is possible for an e-commerce service provider to prompt the user to provide any required user attribute data during each resource request, yet it is more efficient if the e-commerce service provider knows the identity of the attribute information providers that manage user attribute information on behalf of the user.

The present invention allows a user to enroll the identity of a user's attribute information provider at a given e-commerce service provider, which then stores the information in a persistent AIP domain identity token that will be available to the e-commerce service provider. This allows some degree of free movement between domains that participate in the federated environment. The user gains efficiency or productivity in not having to fulfill multiple informational requests, which can be barriers to free movement across Web sites.

Various forms of enrollment operations are supported. The user may initiate an AIP-enrollment operation through one domain yet request that the AIP-enrollment operation should be controlled or completed through a different domain. The user has the ability to direct the user's AIP information to particular federated or non-federated domains, or the user may allow a home domain to suggest a set of domains at which the user should be enrolled.

One of the benefits of the approach of the present invention is that the user can visit any e-commerce service provider without having to maintain user attributes at that particular e-commerce service provider. As long as the e-commerce service provider's domain has a relationship with at least one of the user's attribute information providers, then the user will not have to directly provide user attribute information to the e-commerce service provider. Another benefit of the present invention is that it reduces the number of service providers that maintain a user's personal information, thereby reducing the possibility that a user's personal information will be inadvertently or improperly disclosed.

Compared with the prior art, the present invention assists in a federation that solves the above-mentioned problems by removing informational barriers to free movement across Web sites. A user can gain some efficiency or productivity by not being presented with multiple information requests when entering multiple domains. The present invention attempts to minimize the number of personal information requests that are generated when a user accesses resources within multiple, affiliated domains.

"It is important to note that while the present invention has been described in the context of a fully functioning data processing system, those of ordinary skill in the art will appreciate that the processes associated with the present invention are capable of being distributed in the form of instructions in a computer readable medium and a variety of other forms. Examples of computer readable media include media such as EPROM, ROM, tape, paper, floppy disc, hard disk drive, RAM, and CD-ROMs."

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for managing user attribute information within a data processing system, the method comprising:

receiving an enrollment request message from a first service provider at a second service provider, wherein the enrollment request message informs the second service provider of a set of one or more identifiers of attribute information providers, wherein each of the attribute information providers is a service provider that maintains user attribute information for a user of a client device;

extracting by the second service provider the set of one or more identifiers of attribute information providers from the enrollment request message;

generating by the second service provider a persistent token for the user, wherein the persistent token comprises the set of one or more identifiers of attribute information providers; and managing the persistent token.

2. The method of claim 1 further comprising:
storing the persistent token in a client-side datastore at a client device operated by the user.

3. The method of claim 2 further comprising:
using an HTTP (Hypertext Transport Protocol) redirection message to set the persistent token.

4. The method of claim 2 wherein the persistent token is stored as an HTTP cookie.

5. The method of claim 1 further comprising:
storing the persistent token in a server-side datastore.

6. The method of claim 1 further comprising:
receiving from the user a request for a resource at the second service provider;

obtaining the persistent token for the user;
extracting the set of one or more identifiers of attribute information providers from the persistent token;
retrieving user attribute information for the user from at least one attribute information provider identified in the set of one or more identifiers of attribute information providers; and
performing a customization operation for the resource or an access control decision for the resource based on the retrieved user attribute information for the user.

7. A data processing system for managing user attribute information, the data processing system comprising:
a processor;
a computer memory holding computer program instructions which when executed by the processor perform a method comprising:
receiving an enrollment request message from a first service provider at a second service provider, wherein the enrollment request message informs the second service provider of a set of one or more identifiers of attribute information providers, wherein each of the attribute information providers is a service provider that maintains user attribute information for a user of a client device;
extracting by the second service provider the set of one or more identifiers of attribute information providers from the enrollment request message;
generating by the second service provider a persistent token for the user, wherein the persistent token comprises the set of one or more identifiers of attribute information providers; and
managing the persistent token.

8. The data processing system of claim 7 wherein the method further comprises:
storing the persistent token in a client-side datastore at a client device operated by the user.

9. The data processing system of claim 8 wherein the method further comprises:
using an HTTP (Hypertext Transport Protocol) redirection message to set the persistent token.

10. The data processing system of claim 8 wherein the persistent token is stored as an HTTP cookie.

11. The data processing system of claim 7 wherein the method further comprises:
storing the persistent token in a server-side datastore.

12. The data processing system of claim 7 further comprising wherein the method further comprises:
receiving from the user a request for a resource at the second service provider;
obtaining the persistent token for the user;
extracting the set of one or more identifiers of attribute information providers from the persistent token;
retrieving user attribute information for the user from at least one attribute information provider identified in the set of one or more identifiers of attribute information providers; and
performing a customization operation for the resource or an access control decision for the resource based on the retrieved user attribute information for the user.

13. A computer program product in a computer readable medium for managing user attribute information in a data processing system, the computer program product holding computer program instructions which when executed by the data processing system perform a method comprising:
receiving an enrollment request message from a first service provider at a second service provider, wherein the enrollment request message informs the second service provider of a set of one or more identifiers of attribute information providers, wherein each of the attribute information providers is a service provider that maintains user attribute information for a user of a client device;
extracting by the second service provider the set of one or more identifiers of attribute information providers from the enrollment request message;
generating by the second service provider a persistent token for the user, wherein the persistent token comprises the set of one or more identifiers of attribute information providers; and
managing the persistent token.

14. The computer program product of claim 13 wherein the method further comprises:
storing the persistent token in a client-side datastore at a client device operated by the user.

15. The computer program product of claim 14 wherein the method further comprises:
using an HTTP (Hypertext Transport Protocol) redirection message to set the persistent token.

16. The computer program product of claim 14 wherein the persistent token is stored as an HTTP cookie.

17. The computer program product of claim 13 wherein the method further comprises:
storing the persistent token in a server-side datastore.

18. The computer program product of claim 13 wherein the method further comprises:
receiving from the user a request for a resource at the second service provider;
obtaining the persistent token for the user;
extracting the set of one or more identifiers of attribute information providers from the persistent token;
retrieving user attribute information for the user from at least one attribute information provider identified in the set of one or more identifiers of attribute information providers; and
performing a customization operation for the resource or an access control decision for the resource based on the retrieved user attribute information for the user.

19. A method for managing user attribute information within a data processing system, the method comprising:
receiving a request message at a first service provider from a client device;
initiating by the first service provider an enrollment operation for a user of the client device in response to receiving the request message;
obtaining at the first service provider a set of one or more identifiers of attribute information providers, wherein each of the attribute information providers is a service provider that maintains user attribute information for the user; and
enrolling the set of one or more identifiers of attribute information providers at a second service provider.

20. The method of claim 19 further comprising:
sending an enrollment request message from the first service provider to the second service provider, wherein the enrollment request message informs the second service provider of the set of one or more identifiers of attribute information providers.

21. The method of claim 19 further comprising:
receiving an authentication assertion at the first service provider from a third service provider that authenticated the user.

22. The method of claim 19 further comprising:
receiving the set of one or more identifiers of attribute information providers as input from the user.

23. The method of claim 19 further comprising:
retrieving the set of one or more identifiers of attribute information providers from administratively configured information.

24. The method of claim 19 wherein the set of one or more identifiers of attribute information providers are prioritized.

25. The method of claim 19 further comprising: receiving an identifier for the second service provider as input from the user.

26. The method of claim 19 further comprising:
retrieving an identifier for the second service provider from administratively configured information.

27. The method of claim 19 further comprising:
allowing the user to be partially enrolled if the enrolling step fails at one or more of additional service providers.

28. The method of claim 19 wherein an identifier for a service provider or a domain may comprise a network path, a Uniform Resource Identifier (URI), or a unique name.

29. A data processing system for managing user attribute information, the data processing system comprising:
a processor;
a computer memory holding computer program instructions which when executed by the processor perform a method comprising:
receiving a request message at a first service provider from a client device;
initiating by the first service provider an enrollment operation for a user of the client device in response to receiving the request message;
obtaining at the first service provider a set of one or more identifiers of attribute information providers, wherein each of the attribute information providers is a service provider that maintains user attribute information for the user; and
enrolling the set of one or more identifiers of attribute information providers at a second service provider.

30. The data processing system of claim 29 wherein the method further comprises:
sending an enrollment request message from the first service provider to the second service provider, wherein the enrollment request message informs the second service provider of the set of one or more identifiers of attribute information providers.

31. The data processing system of claim 29 wherein the method further comprises:
receiving an authentication assertion at the first service provider from a third service provider that authenticated the user.

32. The data processing system of claim 29 wherein the method further comprises:
receiving the set of one or more identifiers of attribute information providers as input from the user.

33. The data processing system of claim 29 wherein the method further comprises:
retrieving the set of one or more identifiers of attribute information providers from administratively configured information.

34. The data processing system of claim 29 wherein the set of one or more identifiers of attribute information providers are prioritized.

35. The data processing system of claim 29 wherein the method further comprises:
receiving an identifier for the second service provider as input from the user.

36. The data processing system of claim 29 wherein the method further comprises:
retrieving an identifier for the second service provider from administratively configured information.

37. The data processing system of claim 29 wherein the method further comprises:
allowing the user to be partially enrolled if the enrolling step fails at one or more of additional service providers.

38. The data processing system of claim 29 wherein an identifier for a service provider or a domain may comprise a network path, a Uniform Resource Identifier (URI), or a unique name.

39. A computer program product in a computer readable medium for managing user attribute information in a data processing system, the computer program product holding computer program instructions which when executed by the data processing system perform a method comprising:
receiving a request message at a first service provider from a client device;
initiating by the first service provider an enrollment operation for a user of the client device in response to receiving the request message;
obtaining at the first service provider a set of one or more identifiers of attribute information providers, wherein each of the attribute information providers is a service provider that maintains user attribute information for the user; and
enrolling the set of one or more identifiers of attribute information providers at a second service provider.

40. The computer program product of claim 39 wherein the method further comprises:
sending an enrollment request message from the first service provider to the second service provider, wherein the enrollment request message informs the second service provider of the set of one or more identifiers of attribute information providers.

41. The computer program product of claim 39 wherein the method further comprises:
receiving an authentication assertion at the first service provider from a third service provider that authenticated the user.

42. The computer program product of claim 39 wherein the method further comprises:
receiving the set of one or more identifiers of attribute information providers as input from the user.

43. The computer program product of claim 39 wherein the method further comprises:
retrieving the set of one or more identifiers of attribute information providers from administratively configured information.

44. The computer program product of claim 39 wherein the set of one or more identifiers of attribute information providers are prioritized.

45. The computer program product of claim 39 wherein the method further comprises:
receiving an identifier for the second service provider as input from the user.

46. The computer program product of claim 39 wherein the method further comprises:
retrieving an identifier for the second service provider from administratively configured information.

47. The computer program product of claim 39 wherein the method further comprises:
allowing the user to be partially enrolled if the enrolling step fails at one or more of additional service providers.

48. The computer program product of claim 39 wherein an identifier for a service provider or a domain may comprise a network path, a Uniform Resource Identifier (URI), or a unique name.

* * * * *